US011551821B2

(12) United States Patent
Onderwater et al.

(10) Patent No.: US 11,551,821 B2
(45) Date of Patent: Jan. 10, 2023

(54) TARGET IRRADIATION SYSTEMS FOR THE PRODUCTION OF RADIOISOTOPES

(71) Applicant: BWXT Isotope Technology Group, Inc., Lynchburg, VA (US)

(72) Inventors: Thomas G. Onderwater, Peterborough (CA); Mark A. Alboino, Toronto (CA); Benjamin D. Fisher, Lynchburg, VA (US); Andrew F. Long, Peterborough (CA)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 86 days.

(21) Appl. No.: 16/548,952

(22) Filed: Aug. 23, 2019

(65) Prior Publication Data
US 2020/0075180 A1    Mar. 5, 2020

Related U.S. Application Data

(60) Provisional application No. 62/723,328, filed on Aug. 27, 2018.

(51) Int. Cl.
*G21C 1/30* (2006.01)
*G21K 5/08* (2006.01)
(Continued)

(52) U.S. Cl.
CPC ............... *G21C 1/303* (2013.01); *G21G 1/02* (2013.01); *G21K 5/08* (2013.01); *G21C 23/00* (2013.01);
(Continued)

(58) Field of Classification Search
CPC .. G21C 1/303; G21G 1/02; G21G 2001/0036; G21K 5/08
(Continued)

(56) References Cited

U.S. PATENT DOCUMENTS 3,069,337 A    12/1962   Cabell
3,549,492 A    12/1970   Ricci
(Continued)

FOREIGN PATENT DOCUMENTS

DE    1909382 A1    1/1971
EP    0775651 A2    5/1997
(Continued)

OTHER PUBLICATIONS

Petrie, "Irradiation of miniature fuel specimens in the High Flux Isotope Reactor", ORNL/SPR-2018/874, Oak Ridge National Lab (United States), Jun. 2018. (Year: 2018).*
(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

A target irradiation system for irradiating a radioisotope target in a vessel penetration of a fission reactor, includes a target delivery assembly with a body defining a central bore, a basket that is slidably receivable within the central bore of the body, and a winch that is connected to the basket by a cable. The target delivery assembly is affixed to the vessel penetration of the reactor; and a target passage is in fluid communication with the target delivery assembly. The basket is configured to receive a radioisotope target therein via the target passage and be lowered into the vessel penetration of the reactor when irradiating the radioisotope target. The target delivery system forms a portion of the pressure boundary of the reactor when in fluid communication with the reactor.

17 Claims, 26 Drawing Sheets

(51) Int. Cl.
  *G21G 1/02* (2006.01)
  *G21G 1/00* (2006.01)
  *G21G 1/08* (2006.01)
  *G21C 23/00* (2006.01)

(52) U.S. Cl.
  CPC ............... *G21G 1/001* (2013.01); *G21G 1/08* (2013.01); *G21G 2001/0036* (2013.01)

(58) Field of Classification Search
  USPC .......................................... 376/189, 202, 342
  See application file for complete search history.

(56) References Cited

U.S. PATENT DOCUMENTS

| | | |
|---|---|---|
| 3,681,194 A | 8/1972 | Dieck |
| 4,196,047 A | 4/1980 | Mitchem et al. |
| 5,414,742 A | 5/1995 | Hornak et al. |
| 5,615,238 A | 3/1997 | Wiencek et al. |
| 8,050,377 B2 | 11/2011 | Russell, II et al. |
| 2009/0135983 A1 | 5/2009 | Russell, II et al. |
| 2011/0051872 A1 | 3/2011 | Rickard et al. |
| 2011/0051874 A1 | 3/2011 | Allen et al. |
| 2013/0170927 A1 | 7/2013 | Dayal et al. |
| 2013/0177126 A1 | 7/2013 | Runkle et al. |
| 2013/0223578 A1 | 8/2013 | Russell et al. |
| 2017/0062085 A1 | 3/2017 | Caine et al. |
| 2017/0271033 A1 | 9/2017 | Dodson et al. |
| 2018/0025802 A1 | 1/2018 | Richter et al. |
| 2019/0043630 A1 | 2/2019 | Fisher et al. |
| 2020/0027618 A1 | 1/2020 | Onderwater et al. |
| 2020/0090824 A1 | 3/2020 | Onderwater et al. |

FOREIGN PATENT DOCUMENTS

| | | |
|---|---|---|
| GB | 904608 A | 8/1962 |
| JP | S58152714 A | 9/1983 |
| WO | 2016/207054 A1 | 12/2016 |
| WO | 2018/136125 A2 | 7/2018 |
| WO | 2020046743 A1 | 3/2020 |
| WO | 2020046800 A1 | 3/2020 |

OTHER PUBLICATIONS

International Search Report and Written Opinion, PCT /US2019/ 47882, dated Feb. 6, 2020, 9 pages.
International Search Report and Written Opinion, PCT/US2019/ 048112, dated Oct. 24, 2019, 6 pages.
Dieck L. et al., "Mikrophonschalter zur steuerung von pneumatischen rohrpostanlagen in kernreaktoren," Nuclear Instruments and Methods, vol. 68(1):157-158 (1969).
Extended European Search Report, European Application No. 19854055. 1, dated Apr. 14, 2022, 9 pages.
Supplementary European Search Report, European Application No. 19853957.9, dated Mar. 28, 2022, 8 pages.

* cited by examiner

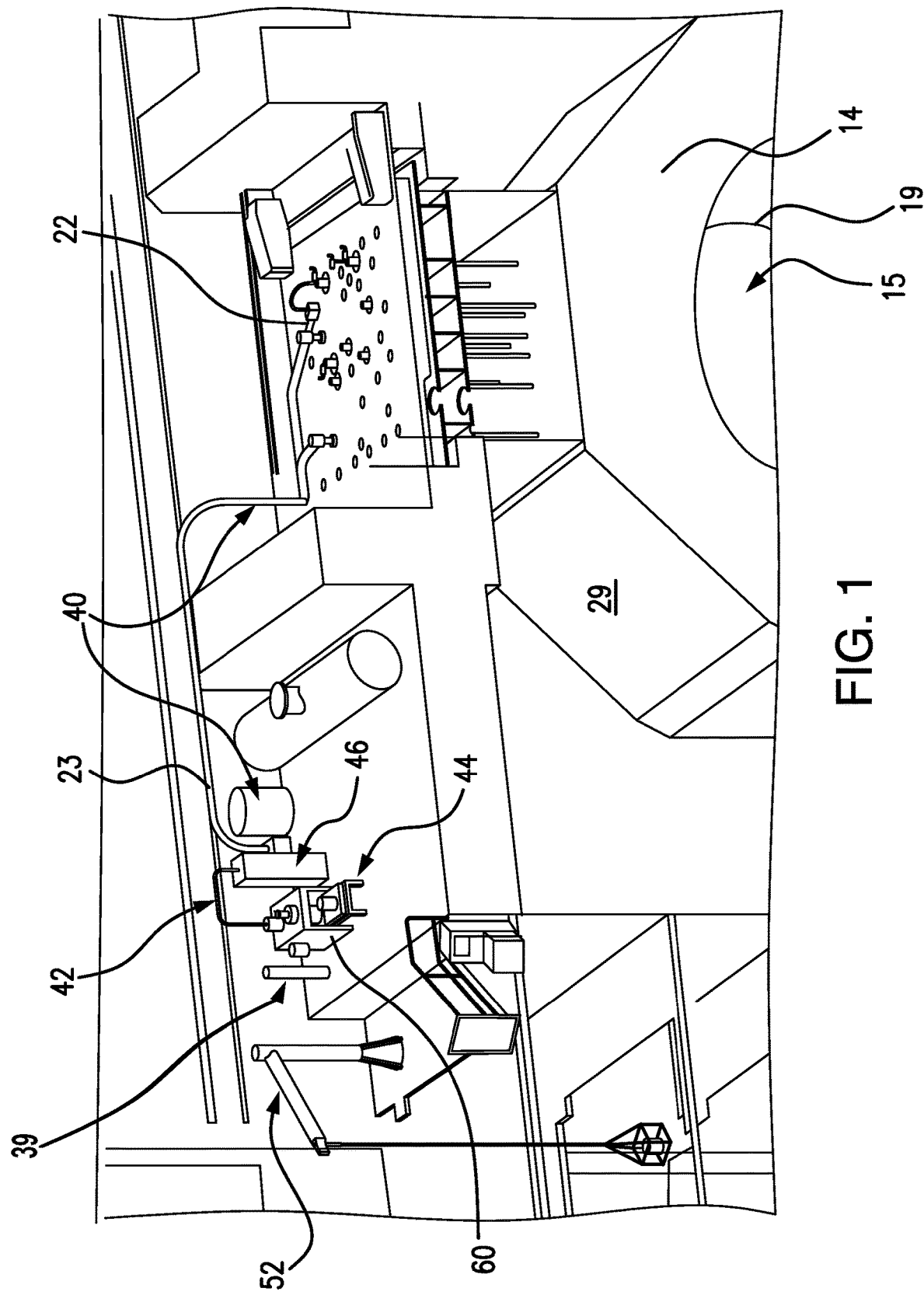

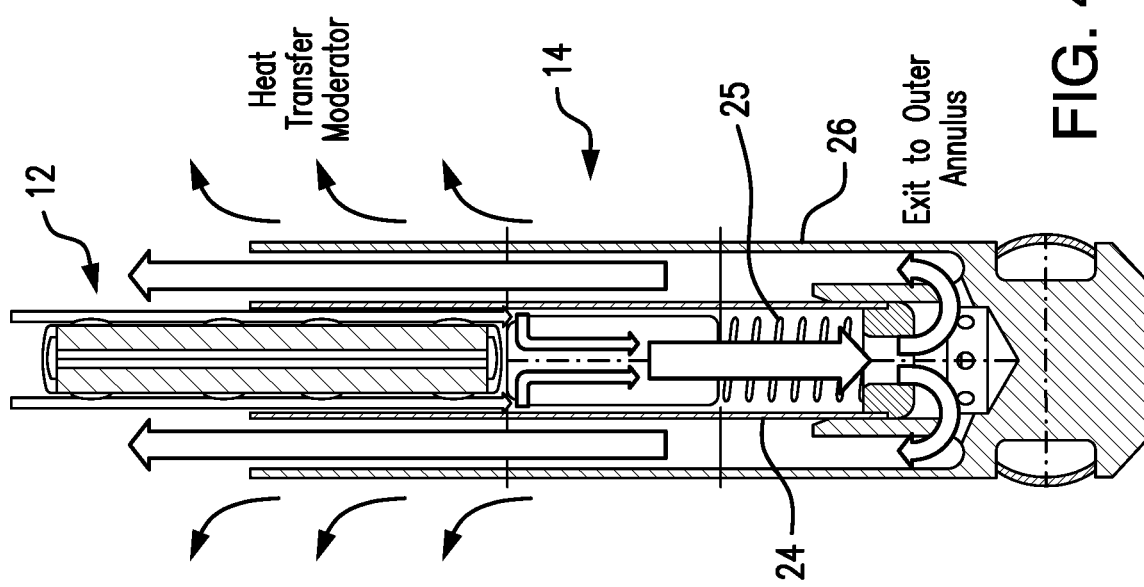
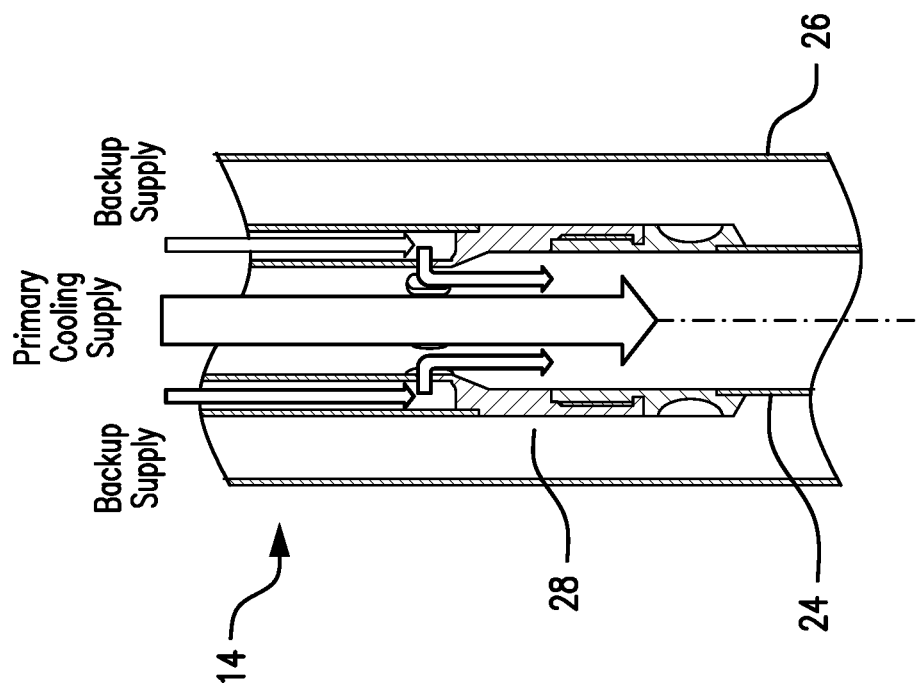

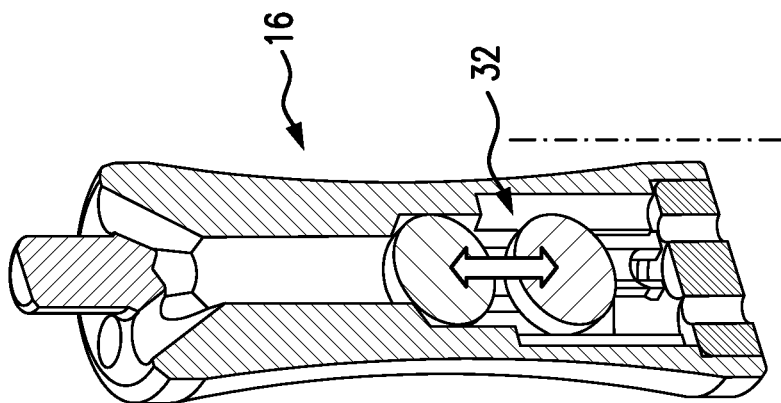
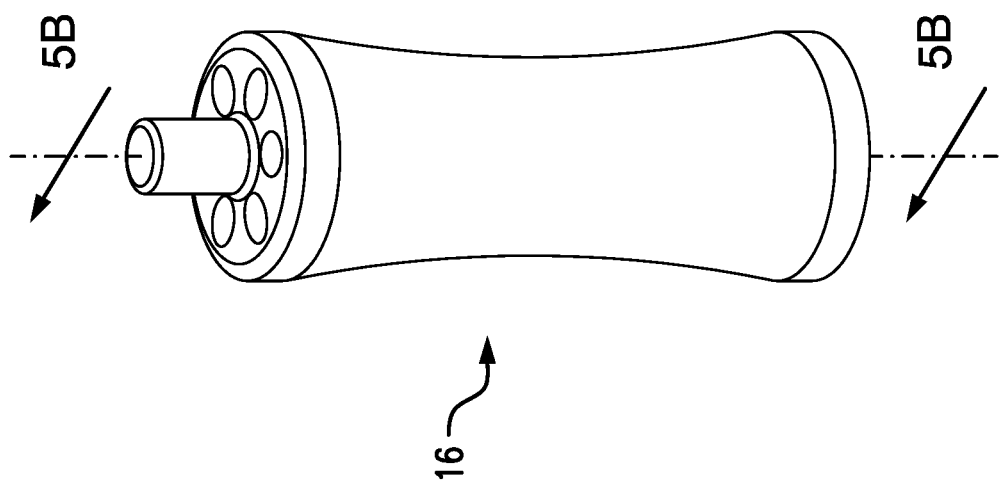
FIG. 5A
FIG. 5B

TARGET IRRADIATION SYSTEMS FOR THE PRODUCTION OF RADIOISOTOPES

CLAIM OF PRIORITY

This application claims priority to U.S. provisional patent application No. 62/723,328 filed Aug. 27, 2018, the disclosure of which is incorporated by reference herein.

TECHNICAL FIELD

The presently-disclosed invention relates generally to systems for irradiating radioisotope targets in nuclear reactors and, more specifically, to systems for irradiating radioisotope targets in heavy water-moderated fission-type nuclear reactors.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites after subsequent processing steps to reduce the Mo-99 to a usable form, such as titanium-molybdate-99 (Ti—Mo99). Mo-99/Tc-99m generators are then distributed from these centralized locations to hospitals and pharmacies throughout the country. Since Mo-99 has a short half-life and the number of existing production sites are limited, it is desirable both to minimize the amount of time needed to reduce the irradiated Mo-99 material to a useable form and to increase the number of sites at which the irradiation process can occur.

There at least remains a need, therefore, for a system and a process for producing a titanium-molybdate-99 material suitable for use in Tc-99m generators in a timely manner.

SUMMARY OF INVENTION

One embodiment of the present disclosure provides a target irradiation system for irradiating a radioisotope target in a vessel penetration of a fission reactor, the system including a target delivery assembly including a body defining a central bore, a basket that is slidably receivable within the central bore of the body, and a winch that is connected to the basket by a cable, the target delivery assembly being affixed to the vessel penetration of the reactor, and a target passage that is in fluid communication with the target delivery assembly, wherein the basket is configured to receive the radioisotope target therein via the target passage and be lowered into the vessel penetration of the reactor when irradiating the radioisotope target, and the target delivery system forms a portion of the pressure boundary of the reactor when in fluid communication with the reactor.

Another embodiment of the present disclosure provides a target irradiation system for irradiating a radioisotope target in a vessel penetration of a fission reactor, the system including a target delivery assembly including an outer tube and an inner tube disposed therein so that an annulus is formed therebetween, at least one flow channel extending between a bottom end of the outer tube and a bottom end of the inner tube, and an elevation piston slidably disposed within the inner tube, the elevation piston including a one-way check valve allowing flow in a downward direction and preventing flow in an upward direction.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

FIG. 1 is a perspective view of a target irradiation system, in accordance with an embodiment of the present disclosure, installed on a CANDU (CANada Deuterium Uranium) reactor;

FIGS. 4A and 4B are cross-sectional views of portions of the hydraulic target well shown in FIG. 3;

FIGS. 5A and 5B are perspective and cross-sectional views, respectively, of an elevation piston of the hydraulic target well shown in FIG. 3;

Figure 2A:
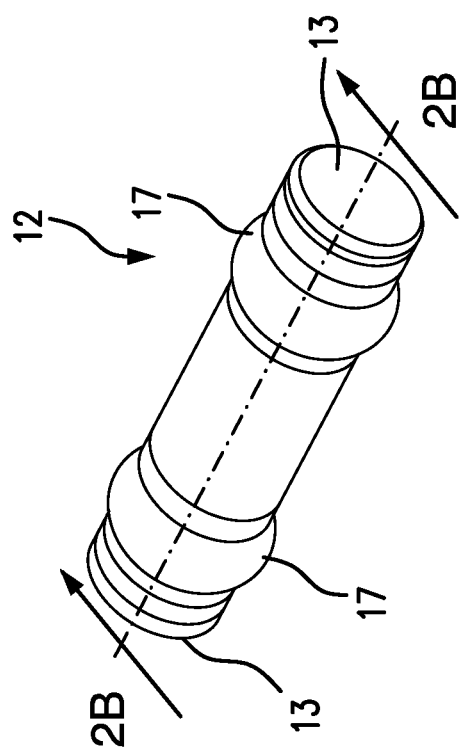
FIGS. 2A and 2B are perspective and cross-sectional views, respectively, of a target capsule of the target irradiation system shown in FIG. 1.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present target irradiation system includes both elements that will be exposed to reactor neutron flux within the core of the reactor, preferably a CANDU (CANada Deuterium Uranium) reactor, and elements that will be affixed to the CANDU reactor civil structures outside of the reactor core. The system also includes a target capsule 12 (FIGS. 2A and 2B) that is designed to interface with the other system elements. There are several components which work together to form the system, FIG. 1 illustrating the system installed on a CANDU reactor.

Figure 3:
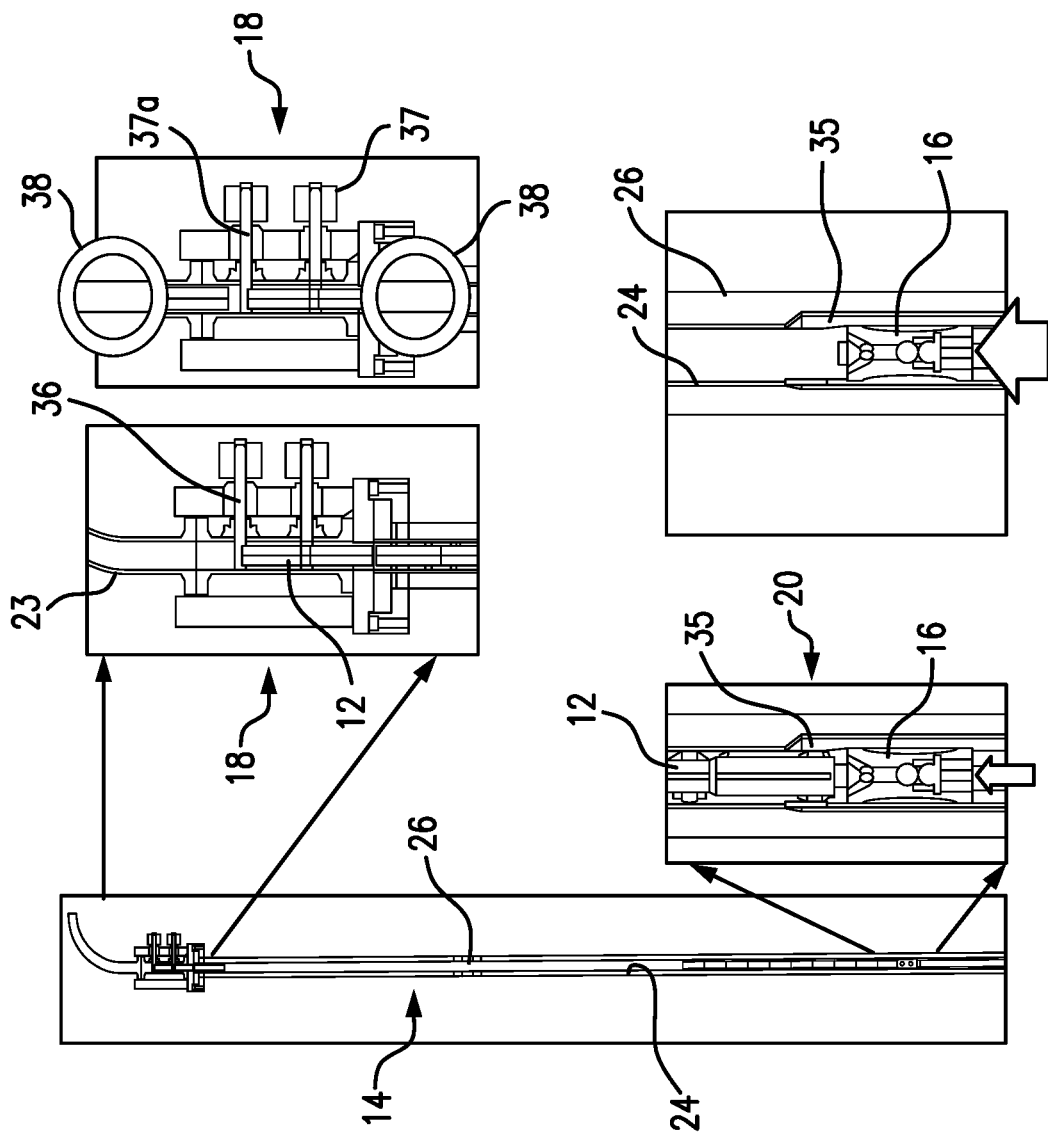
FIG. 3 includes cross-sectional views of a hydraulic target well of the target irradiation system shown in FIG. 1.
Figure 6B:
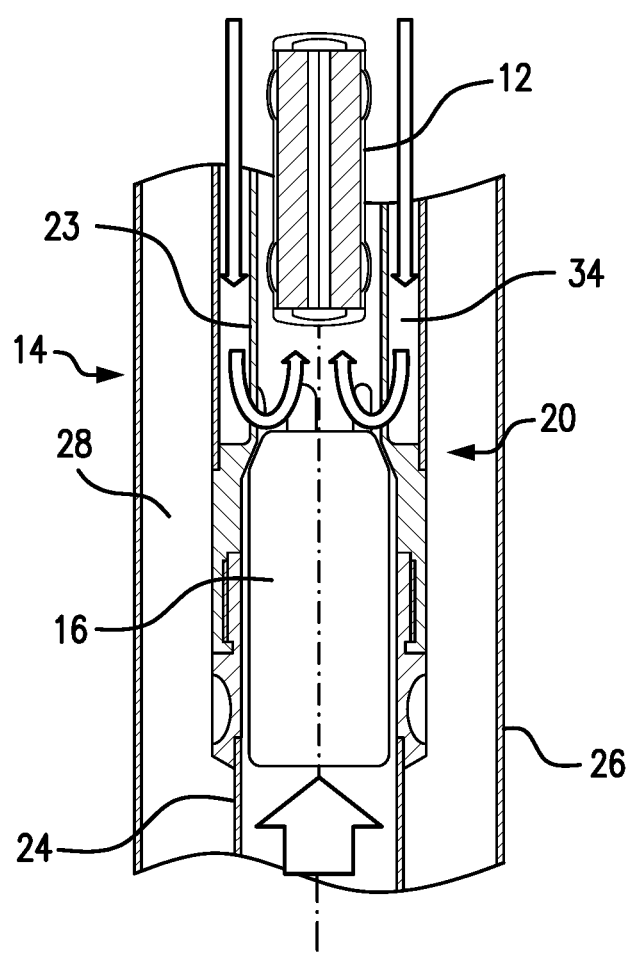
FIGS. 6A and 6B are cross-sectional views of the hydraulic target well shown in FIG. 3.
Figure 6A:
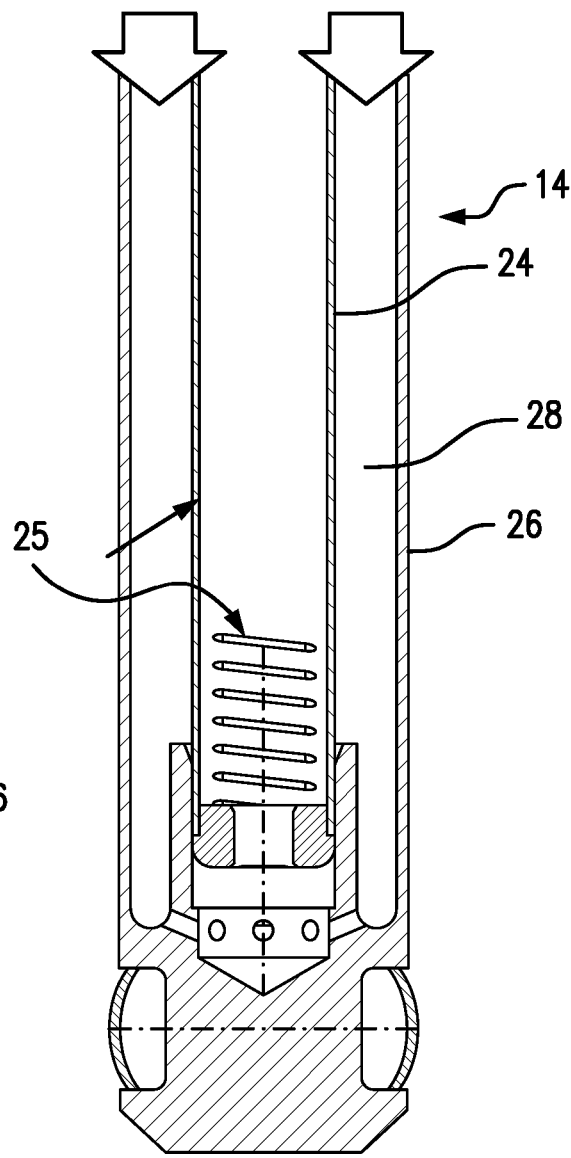

As shown in the figures, the in-core target irradiation system is comprised of a hydraulic target well 14 (FIGS. 4A and 4B), an elevation piston 16 (FIGS. 5A and 5B), a singulation device 18 (FIG. 3), and a suspension (dwell) station 20 (FIGS. 3, 6A and 6B). These components are designed to support the target capsule 12 while it is in neutron flux.

Figure 18:
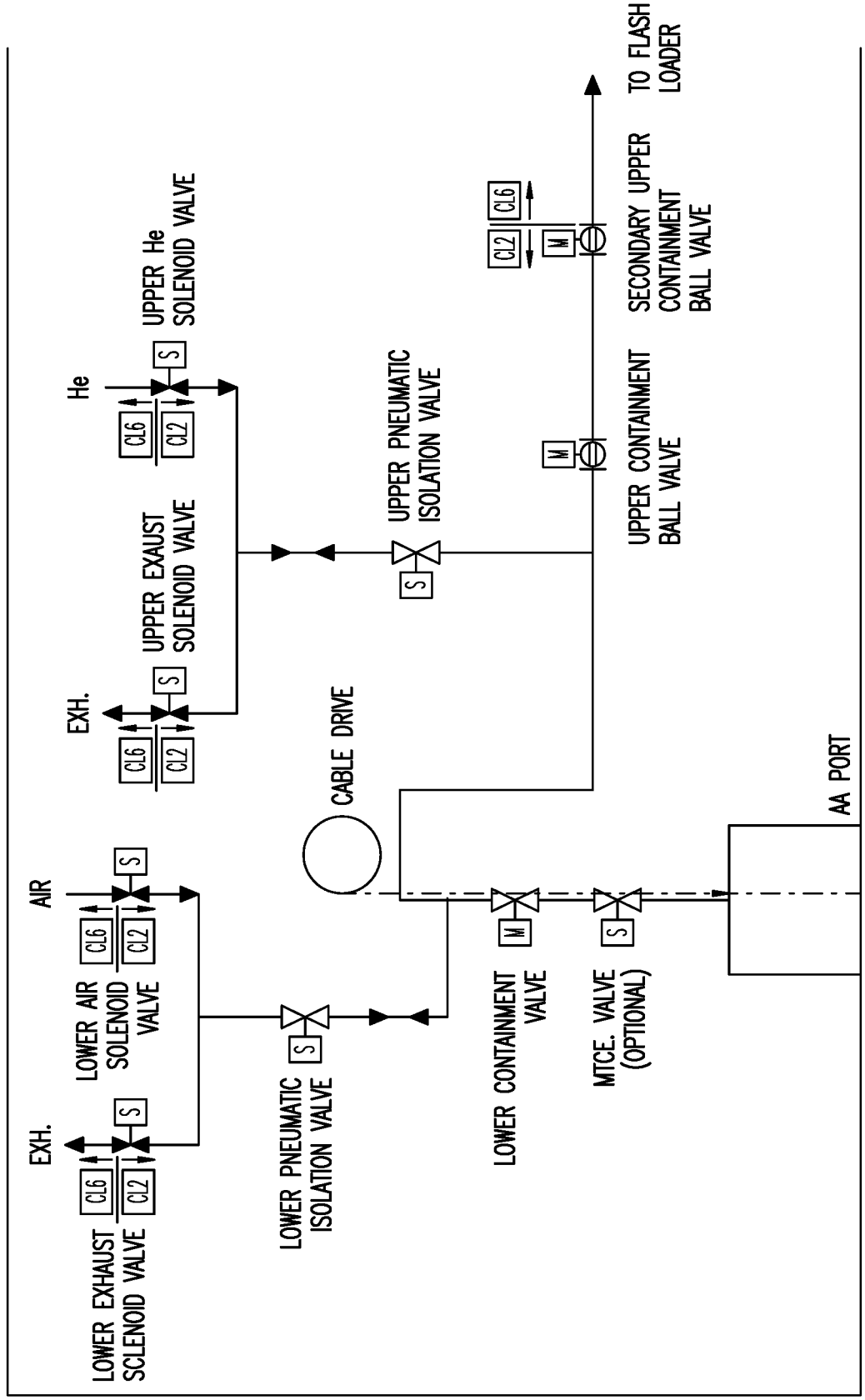
FIG. 18 is a schematic diagram of the piping system of the target irradiation system shown in FIGS. 11 and 12.

As part of the system that will be inserted into the CANDU core, a hydraulic target well (FIG. 3) composed of zirconium alloy-3 and stainless steel is vertically inserted into an existing penetration on the reactor's reactivity management deck (RMD) 22 (FIG. 1). The existing penetration for which the system is currently intended for installation is an out-of-service adjuster absorber (AA) port (FIG. 18). However, this system is not limited to installation in this location and can be installed in other penetration that meet the specifications for installation.

Figure 2B:
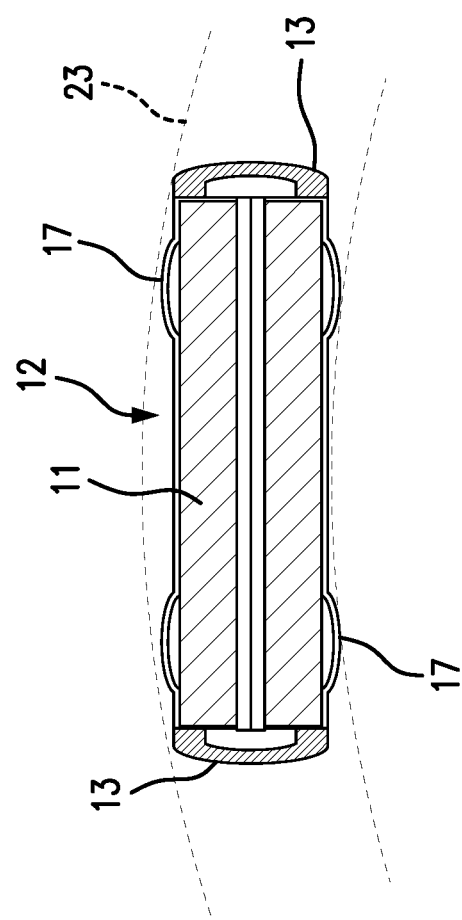

As shown in FIGS. 2A and 2B, the target capsule 12 is the delivery vehicle, which allows for the separation of materials in an inert environment designed to eliminate corrosion related degradation from exposure to environmental mediums, such as the hydraulic transfer medium, while in the core of the reactor. The target capsule 12 is preferably constructed of a commercial grade 5 titanium, which is composed of Titanium-Aluminum-Vanadium (Ti-6Al-4V), with welded endcaps 13. The target capsule 12 is shaped to maximize flow performance through the transfer tubing 23. FIGS. 2A and 2B show the capsule design with a target material of natural molybdenum 11 inside. In order to ensure that the target capsule 12 is secure prior to use in the reactor 15 (FIG. 1) and to maintain its integrity, it preferably undergoes a comprehensive leak test and inspection process during manufacturing. The endcap 13 closure design incorporates allowances, such as side bulges 17, for end forces that could be experienced by the capsule to ensure that the welded joint does not degrade or fail because of impact or forces during transfer. The joint, ends and body section are preferably designed such that they will not be stretched or jammed due to pressures experienced during operation of the system.

Referring to FIG. 3, the target well 14 is the guide and housing for the target capsule 12 from the RMD 22, down into the Calandria 19 (FIG. 1). The target capsule 12 will be positioned within this well at the bottom for a defined duration in order to be exposed to the CANDU reactor neutron flux. During operations, the target capsule 12 is transported up this well to the RMD 22 using hydraulic flow. The propellant medium contemplated by this design is independently supply heavy water ($D_2O$), as this propellant minimizes the health and safety hazardous associated with being exposed to the CANDU reactors neutron flux, and further minimizes the impact on operations of the reactor. This system is not limited to using heavy water as its propellant. Operational set point adjustments would allow for other propellant mediums to be utilized to achieve the same hydraulic flow.

As best seen in FIGS. 4A and 4B, the target well 14 is composed of an inner and outer tube 24 and 26, respectively, with an elevation piston 16 (FIGS. 5A and 5B) and force-limiting device 25 (located within inner tube 24) to limit any damage to other reactor systems because of positive acceleration of the target capsule 12 beyond the operating velocity. FIGS. 4A, 4B, 6A and 6B depict the detailed components of the target well 14 and illustrates the flow paths, as discussed in greater detail below.

As shown in FIGS. 6A and 6B, during the forced cooling process, flow of heavy water will flow down the annulus 28 created between the outer 26 and inner tubes 24 and then divert from the base of the inner tube 24 upward into the inner tube 24. This flow path creates the required flow rate to elevate strings of targets 12 by utilizing the inner tube 24 and the elevation piston 16.

The elevation piston 16, depicted in FIGS. 5A and 5B, includes a central check valve 32 that allows for unidirectional flow. This feature enables elevation of the target string (FIGS. 6A and 6B) while still accounting for the potential need to pass heavy water across the target capsules (FIGS. 4A and 4B) to dissipate heat generated from the irradiation of the target material within the target capsules 12, as shown in FIGS. 4A and 4B. Similarly, this feature allows for the target capsules 12 to fall, under gravity, to the bottom of the well by passively allowing the displacement of heavy water through the check valve 32. The target capsules 12 that have been placed in the reactor and exposed to the CANDU reactor flux will have significant radiation hazards composed of short-half life (1-2 hours) isotopes, and medium-half life (4-6 hours) isotopes. Since this presents a significant hazard to the CANDU reactor station, the target well 14 has been designed with a suspension (dwell) station 20 (FIGS. 3, 6A and 6B).

The dwell station 20, shown in FIGS. 3, 6A and 6B, is located outside of the Calandria 19 but beneath the RMD 22, in the concrete shield structure 29 (FIG. 1) of the CANDU reactor. The location of this feature is important to its function, as being located outside of the CANDU reactor flux region affords the ability to arrest the target capsules 12 in a string and allow for the short half-life isotopes to decay away. This arresting feature enables the safe and economic removal of the targets while eliminating some of the radiation hazard associated with the target material and target capsules. The feature can be customized with a variety of durations for the arresting period, as this will be dependent on the material encapsulated and the duration of the irradiation performed.

It is anticipated that the control system for this feature will preferably include an operational set point based on the material that will calculate the required delay time for safe removal. The implementation of this feature assists the out of core portion of the system by reducing the shielding required, in turn reducing the weight load placed on the RMD 22. This is desirable as the RMD 22 has design constraints related to maximum weight load and is seismically sensitive area.

As best seen in FIGS. 6A and 6B, the construction of the dwell station 20 is a constriction of the inner well tube 24 in which the elevation piston 16 nests to form a seal, thereby reducing the flow on the target capsule 12 such that they will return to an arrested position on the nested elevation piston 16. Side channels 34 are disposed above the nesting point between the inner tube 24 and a central tube 23 disposed therein, to allow for the injection of fresh (un-irradiated) heavy water to reduce the radiation hazard presented by irradiated heavy water. Following the defined dwell period, the flow rate increases allowing for the transport of the string of target capsules 12 to the singulator 18 (FIG. 3). During this phase of operations, the elevation piston 16 remains nested in the inner tube constriction 35, as shown in FIG. 6B.

As shown in FIG. 3, another feature of the present system is the singulator 18, which is an automated device attached to the top of the target well on the RMD 22. The singulator 18 utilizes solenoids 37 that provide simple movement to alternate restraining a target capsule 12 and releasing a target capsule 12 into the out-of-core portion of the system. An electromagnet provides force without penetrating the heavy water pipe and a sealed thimble contains the activated rod 37a of the solenoid 35. This feature also acts as a barrier in the event of a target capsule 12 being injected into the target well 14 in error. At this point, the target capsule 12 would be stopped prior to entering the reactor and becoming an operational or safety hazard to the CANDU station. Further, in the event of early activation of the system resulting in the target capsules 12 being extracted early this will act as a barrier to again protect CANDU station personnel and systems from injury, exposure or damage.

Still referring to FIG. 3, another feature of the present system are fast-acting, pneumatically-actuated isolation valves 38. The isolation valves 38 are in place to allow the isolation of the in-core and out-core portions of the system from each other in the event of a breach of containment, or wherever isolation of either portion of system is required (i.e. for maintenance).

Figure 7A:
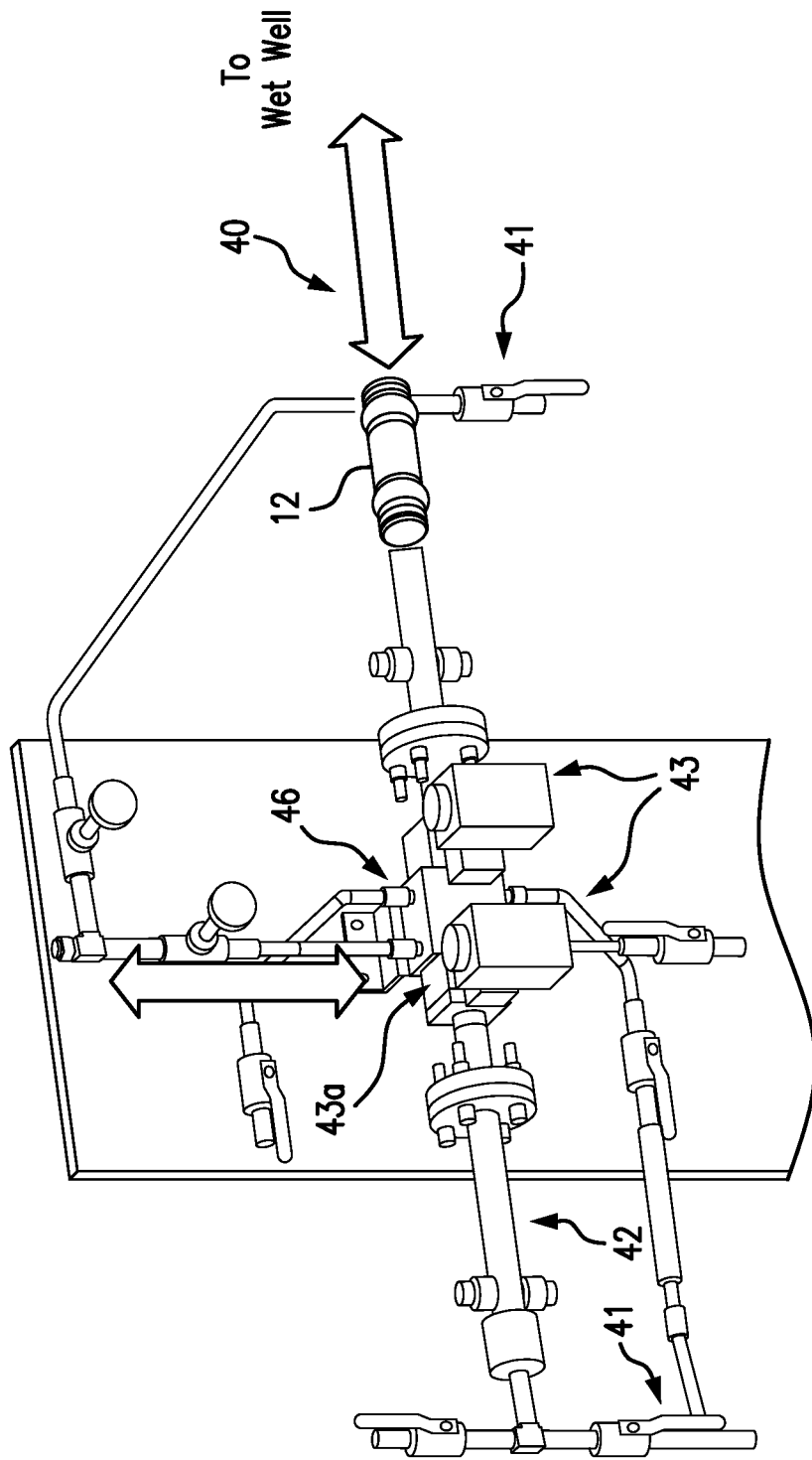
FIGS. 7A, 7B, and 7C are perspective views of the airlock station of the target irradiation system shown in FIG. 1.
Figure 7B:
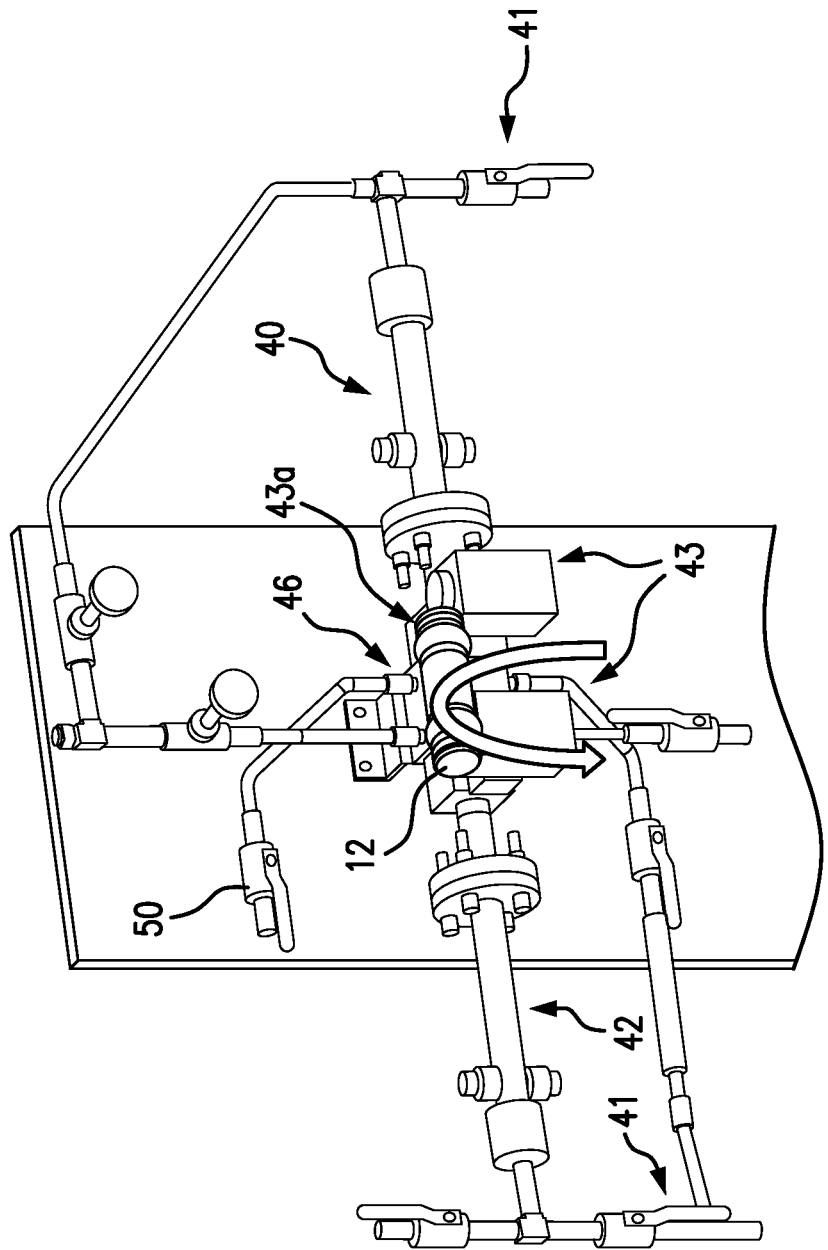
Figure 7C:
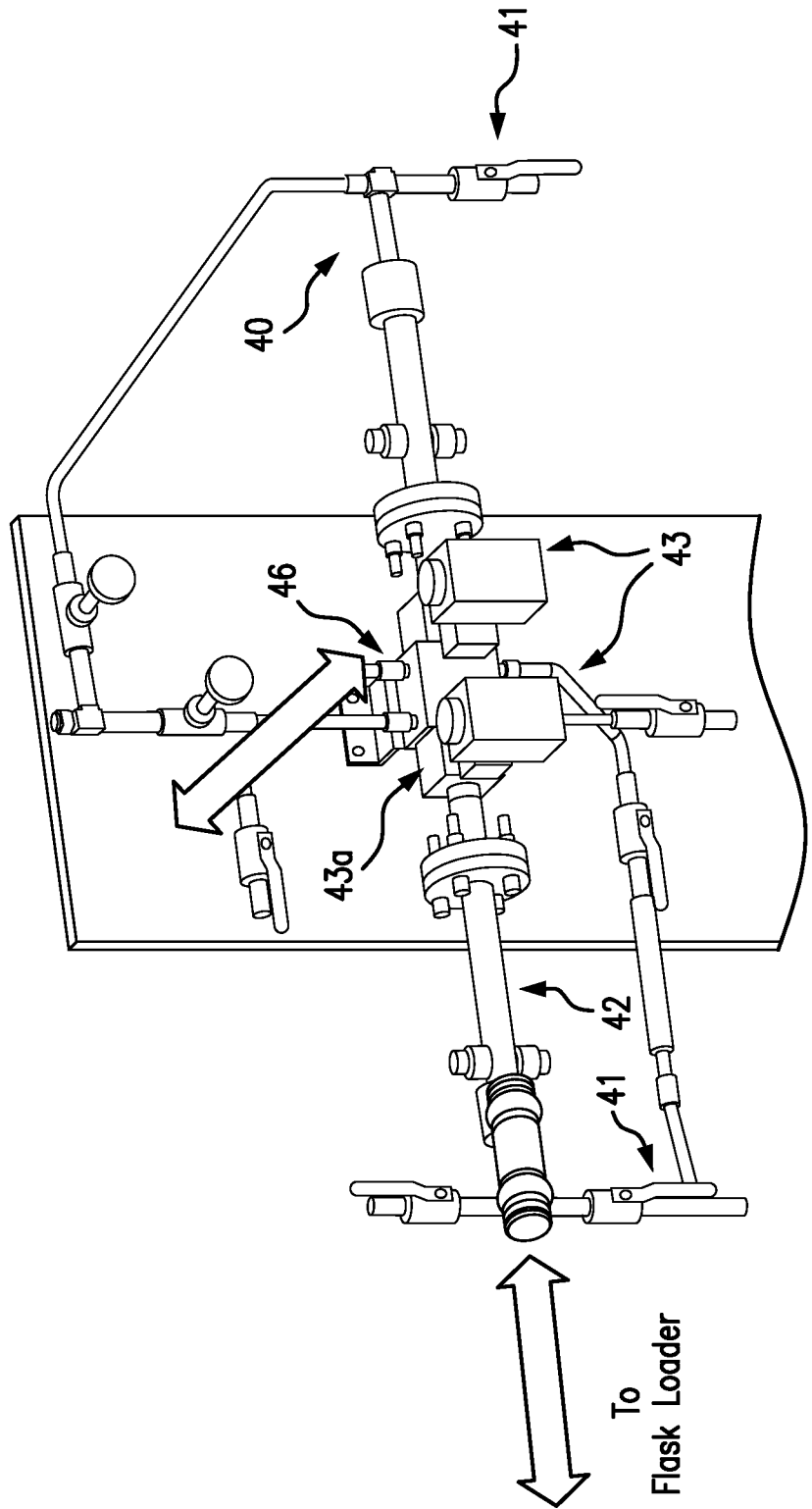

Referring to FIG. 1, the out-core portion of the system of several different elements, including hydraulic transfer system 40, a pneumatic transfer system 42, including a pneumatic pressure source 39 a flask loading station 44, and a waystation airlock 46 (FIGS. 7A through 7C). Each of the components of the out-core portion are connected to one another and interface with one another to complete their defined actions.

The hydraulic transfer system 40 is a closed loop hydraulic system transports the target capsules 12 into and out of the reactor at variable flow rates. The hydraulic system interacts with the pneumatics system 42 by means of an airlock (FIGS. 7A through 7C). The airlock purges an inner volume 43 with the pneumatic medium or the hydraulic medium to move targets 12 between the two systems, while ensuring that the mediums to not contaminate one another. This is important to minimize the hazards that may occur when two propellant mediums become mixed.

The supply portion of the system consists of a propellant tank, circulation pump and filtration equipment (not shown). The supply portion provides the flow of propellant to the target well 14. The propellant is pumped to the target well 14 using a series of control and shutoff valves 41 and 43, respectively. These valves allow for the manipulation of flow directions, depending on the specific operation being performed. Two main propellant lines are used to flow into and out of the target well 14. One line is used for the flow of target capsules between the target airlock (within this system) and the target well.

The control and shutoff valves 41 and 43 are located at the target airlock, off of the RMD 22 (as shown in FIG. 1), in an accessible area of the CANDU control station. Flow to the airlock 46 and the well 14 is distributed by a header that is also at the off deck location. Shutoff valves 43 are also positioned on top of each well on the RMD 22. The system utilizes full port ball valves in the target capsule travel lines, this is because these valves maintain a constant inner diameter to allow the passage of target capsule.

Figure 8A:
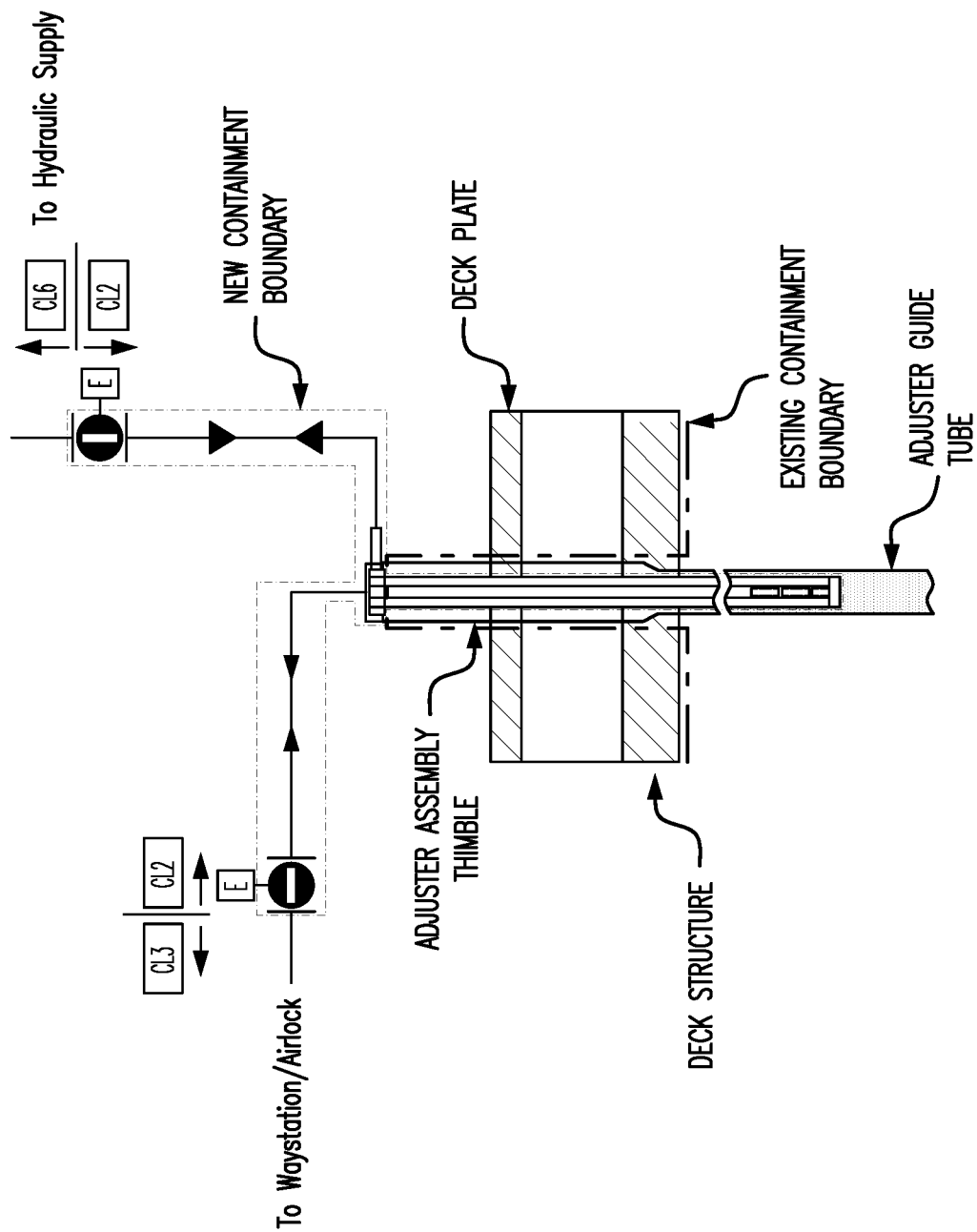
FIGS. 8A and 8B are schematic views of the piping systems in the vicinity of the hydraulic target well and the airlock station, respectively.
Figure 8B:
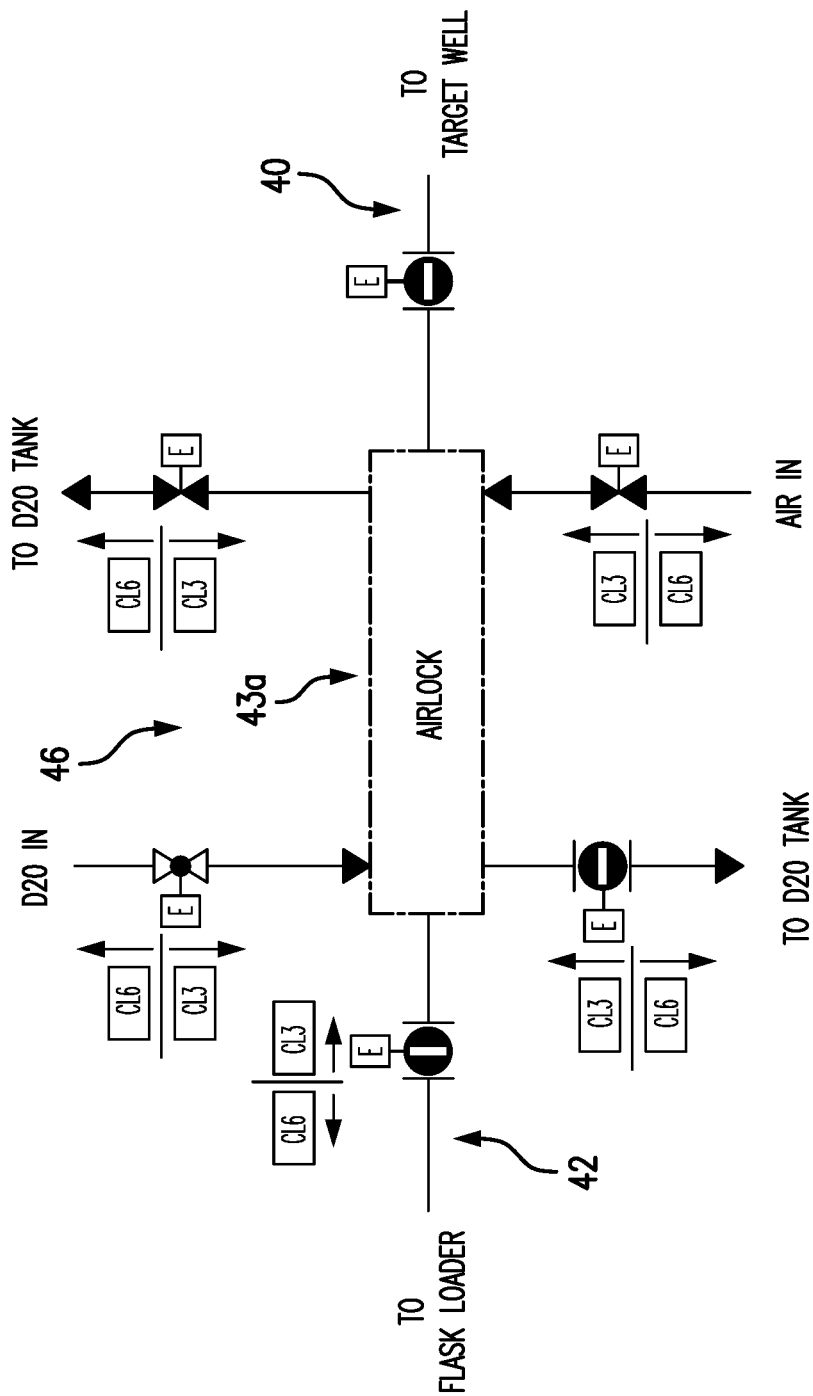

Referring to FIGS. 8A and 8B, the system is rated as Nuclear Class 2, 3 or 6 dependent on the location within the system. In general, all containment boundary piping, tubing, or components are rated to Class 2. The piping, tubing and components that form the target capsule travel lines are rated to Class 3. And, the supply piping and components are rated to Class 6. Further, this system will have portions that are seismically qualified to Design Basis Event (DBE)-A.

The airlock waystation 46, depicted in FIGS. 7A through 7C, functions to extract/introduce the target capsules 12 from the hydraulic or pneumatic transfer systems, flood (FIG. 7A) or dry (FIG. 7B) them, prior to releasing them into the hydraulic or pneumatic transfer systems. The airlock waystation 46 consists of two main shutoff valves 43 and an interstitial volume 43a in between them where the target capsule 12 can be isolated from the rest of the system.

The function of the system is such that target capsules 12 will either arrive wet from the hydraulic system 40 or dry from the pneumatic system 42. The system will perform one or two functions, either flow the internal cavity 43a to wet the target capsules 12 for entry into the hydraulic system 40 or purge and dry the target capsules 12 for entry into the pneumatic system 42. The operation is dependent on the operation being performed by the system (injection or harvesting).

The drying of target capsules (FIG. 7B) involves first isolating the target capsule 12 in the interstitial volume 43a. Once inside the volume 43a, the hydraulic propellant drains and purging of the volume occurs. The volume is then dried with heated air to remove any residual moisture, which may contain a hazardous such as tritium, before releasing the target capsule to the pneumatic system. This feature eliminates the potential for the two propellants to mix and eliminates hazards to workers and the station in the event that an airborne hazardous exist in the moist air which remains in the cavity prior to release into the pneumatics system. The use of a humidity sensor located in the drain lines of the airlock waystation 46 is used to signal when the interstitial volume 43a is sufficiently dry.

The flooding of new target capsules 12 utilizes a similar process. First, the target capsule 12 is isolated in the interstitial volume 43. The hydraulic propellant is then introduced into the volume 43a and a vent valve 50 (FIG. 7B) is opened to allow the air within the volume 43a to escape following the displacement by the hydraulic propellant. Finally, once the target is flooded with hydraulic propellant, it is released into the hydraulic system 40 and wet well 14.

The pneumatic system 42 is a connecting system that connects the waystation airlock 46 and the flask loader 44. The system is composed of the following elements: a compressor package, with inlet filtering, after-cooler and moisture separator; a "wet" receiver located downstream of the compressor package and upstream of the air dryer package; an air dryer package, with inlet coalescing filter and an outlet filter; a "dry" receiver located downstream of the dryer package; regulating valves downstream of the "dry" receiver to control and system pressure; a heating element downstream of the pressure relief valve; and control valves in multiple locations used to control direction and velocity of the flow.

During operation of the pneumatic system 42, the compressor fills the receiver with ambient air until the high pressure point on the receiver pressure switch is achieved, at which point the compressor shuts off. As the system draws air from the receiver, the pressure in the receiver will reduce until the low pressure switch set point is triggered, causing the compressor to start operations again. In the event that the high pressure switch on the receiver fails, there is a pressure relief valve that will exhaust excess air to the CANDU stations vapor recovery system through the hydraulic propellant reservoir.

The pressurized air from the receiver is fed through the desiccant air dryer into a second dry receiver, where the dried air accumulates for use during the target capsule drying operations. Following the completion of target capsule drying operations, air from the system is introduced into the waystation allowing the transport of the target capsules to the flask loader station 44.

Figure 9:
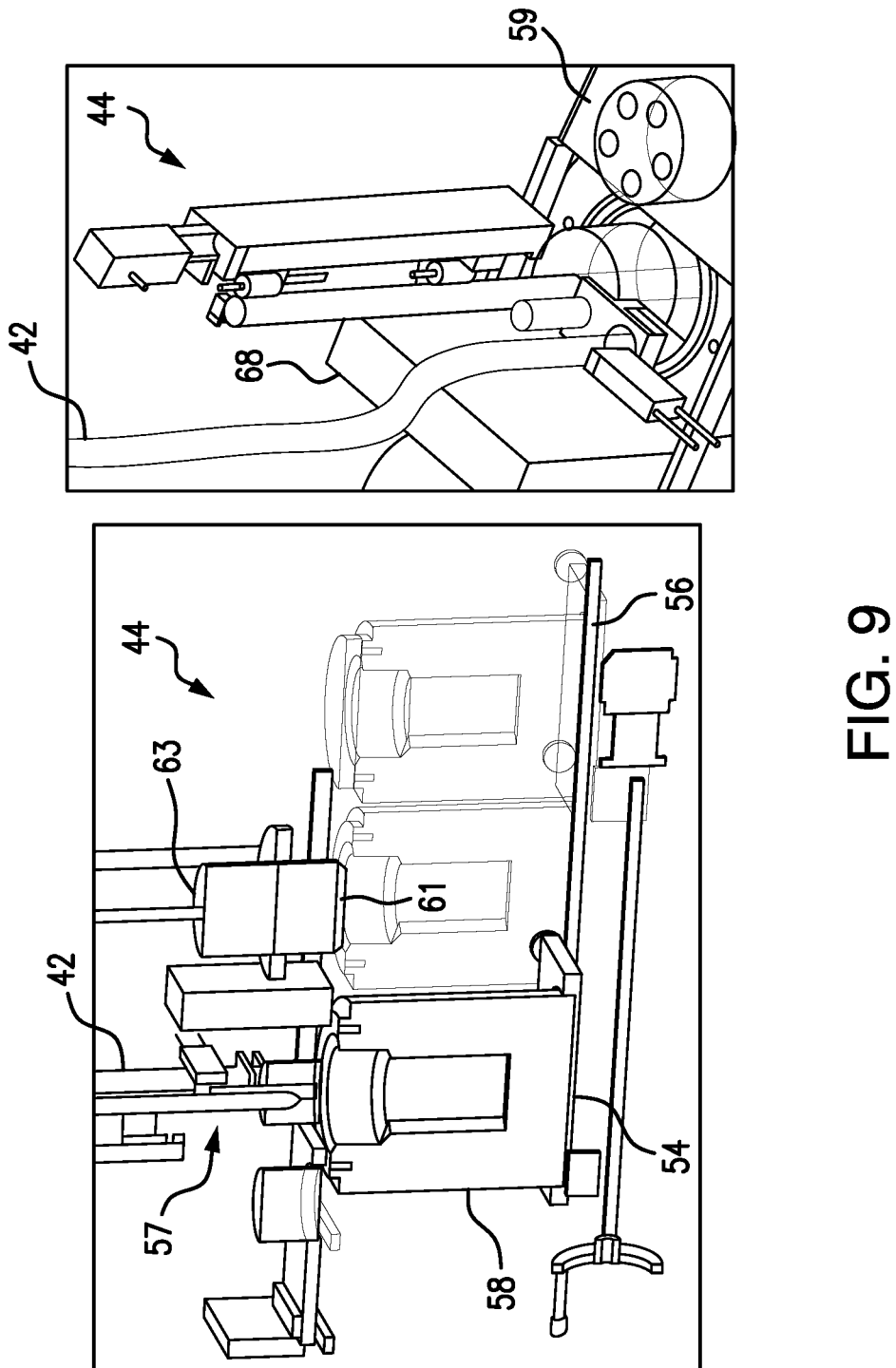
FIG. 9 is a cross-sectional view of the flask loader of the target irradiation system shown in FIG. 1.

The flask loader station 44, as shown in FIG. 9, utilizes a cradle 54 to allow the placement of a transportation shield flask 58. The cradle 54, mounted to a linear drive system 56, transports the flask 58 inside of a shield cabinet 60 (FIG. 1, interior of the flask loader) which is not shown in FIG. 9 for ease of viewing the internal components. A shielded door 68 is closed to prevent the release of radioactive particles or any radiation emission. At a first position within the flask loader, the flask's shield plug 61 is removed using an air actuated cylinder to lower an energized magnet 63 onto the shield plug 61 of the flask 58. The flask 58 with shield plug removed then proceeds the next position and a target capsule magazine 59 (FIG. 10) is elevated from the flask.

The target capsule magazine 59 is elevated using a vertical linear device with a locking hollow shaft. The shaft is first lowered to a predetermined height inside of a central hole then the shaft is rotated a calculated number of degrees and hooked onto the magazine 59 cross-pin. At this point, the shaft ascends to present the magazine to the pneumatic system 57 to load the magazine 59. The magazine 59 is indexed in place to ensure alignment with the pneumatic system.

Figure 10:
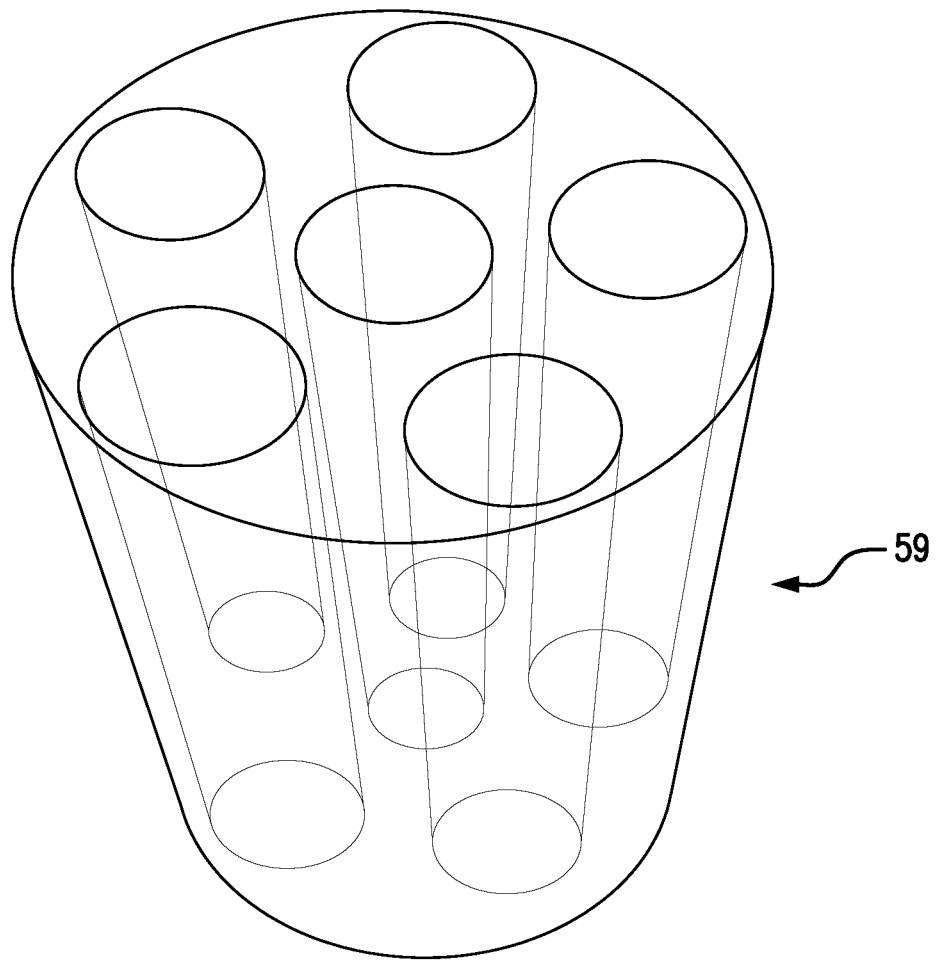
FIG. 10 is a perspective view of a target magazine of the target irradiation system shown in FIG. 1.

Once the magazine 59, as best seen in FIG. 10, is in position, the target capsule is released into the position by free-fall. The bottom of the receiving position on the magazine 59 is fitted with a landing pad composed of high strength material which absorbs shock so that the target capsule is not damaged. The magazine 59 is then indexed to the next position and the operation is repeated. Once a magazine 59 is filled, it is returned to the flask 58 and the reverse of the unload process is performed. A crane 52 (FIG. 1) is used to move the flask 58 to the desired transportation area.

Figure 11:
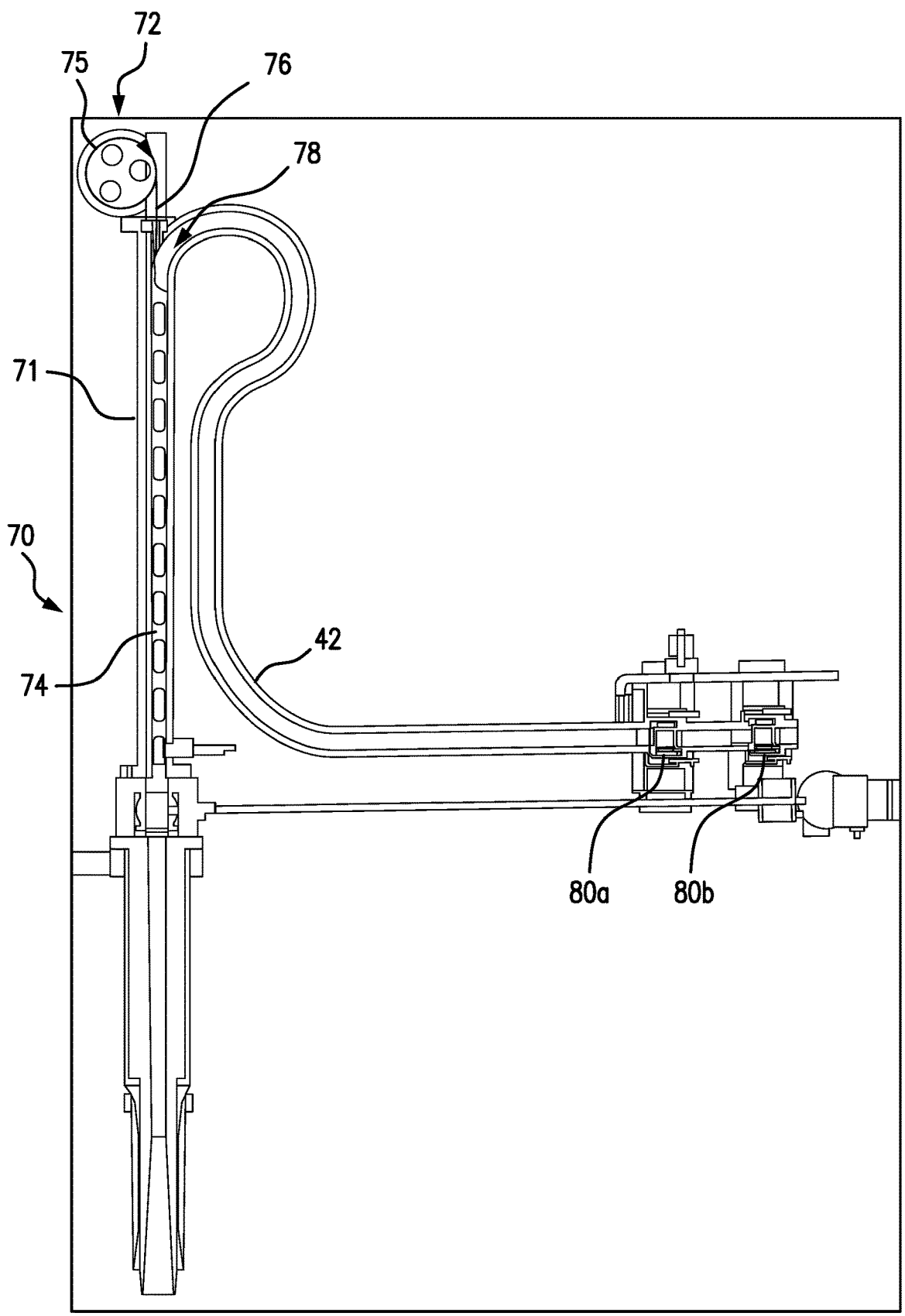
FIG. 11 is an alternate embodiment of a target irradiation system in accordance with the present invention.
Figure 12:
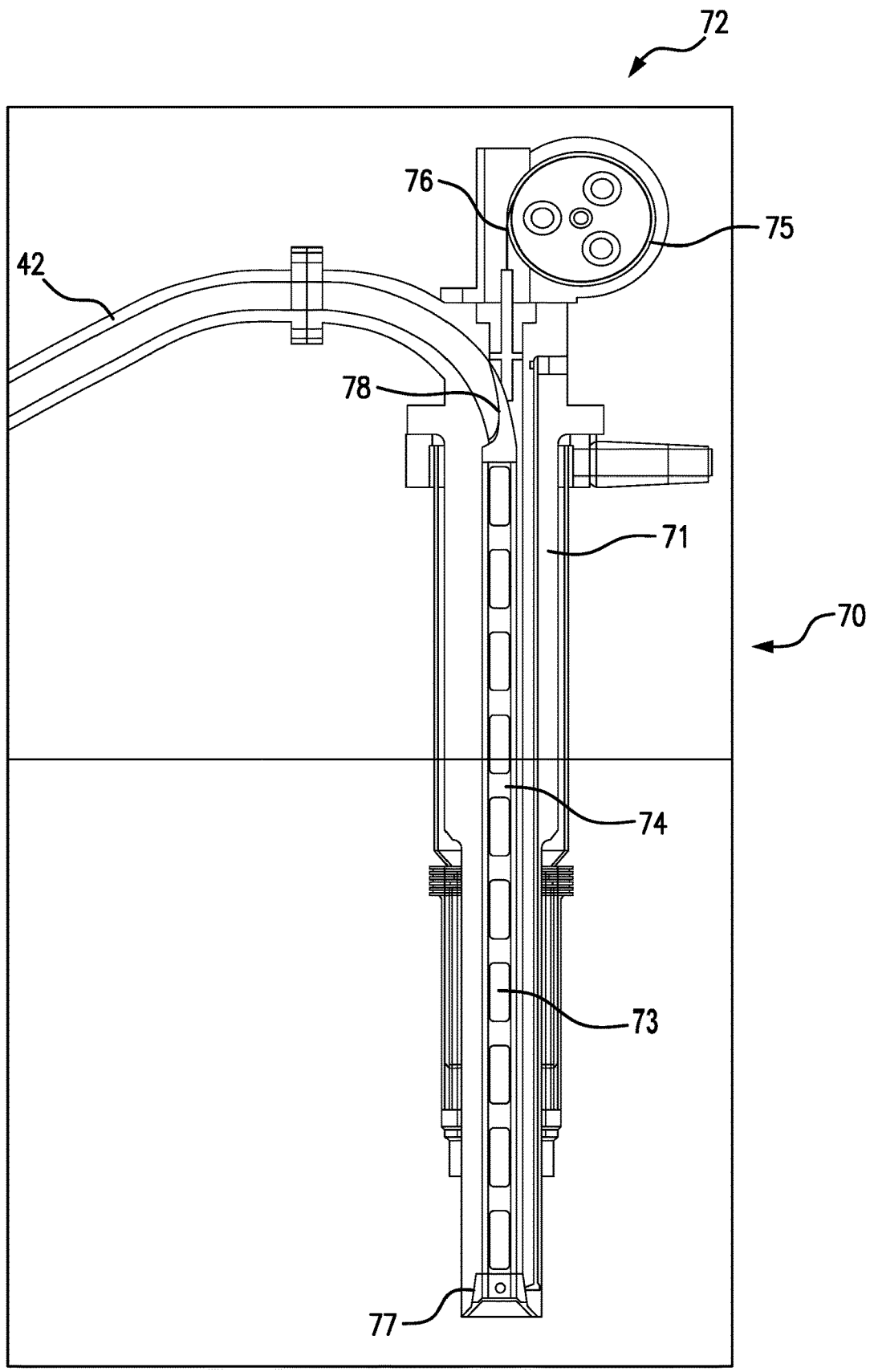
FIG. 12 is an alternate embodiment of a target irradiation system in accordance with the present invention.
Figure 16:
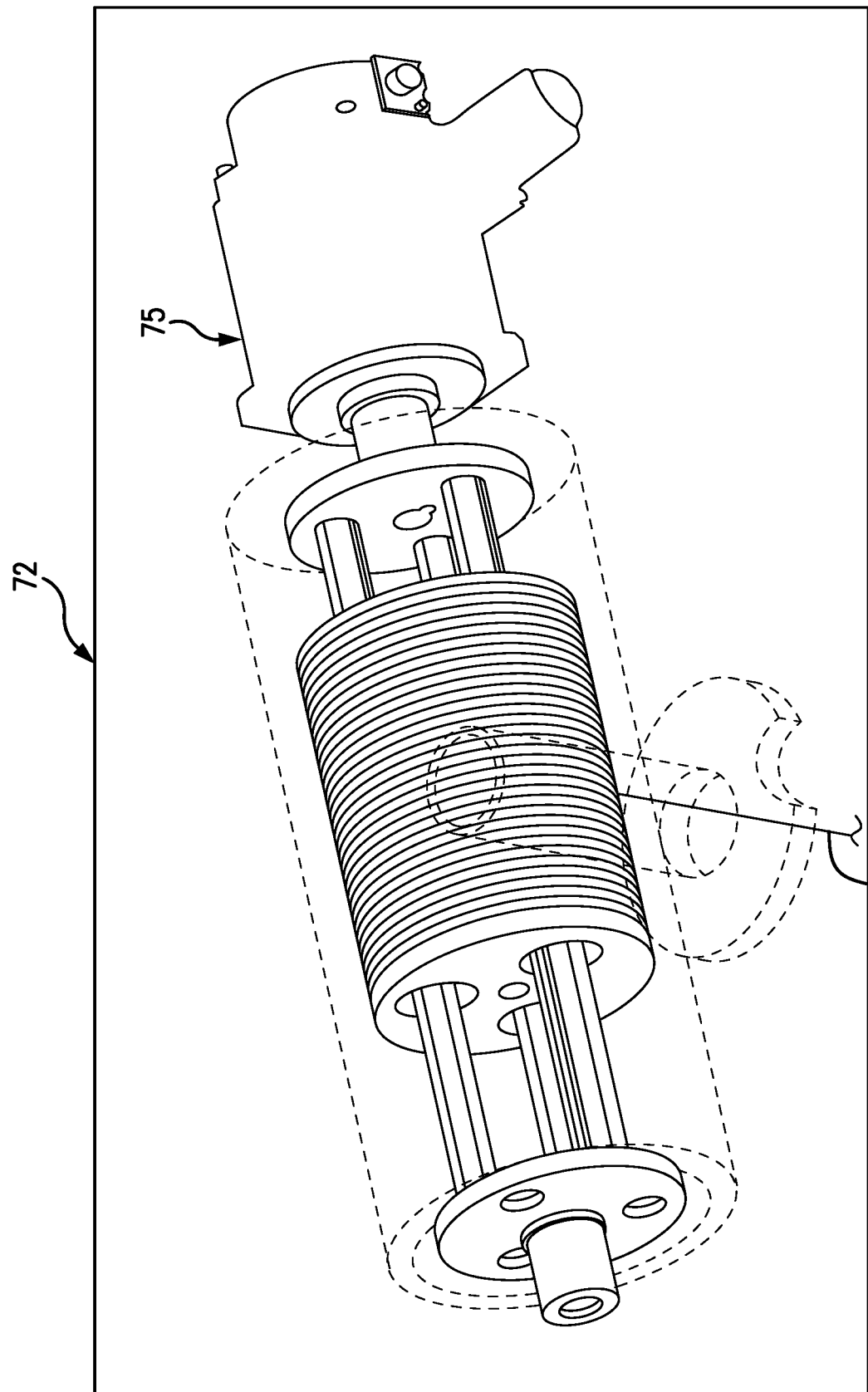
FIG. 16 is a perspective view of a mechanical cable drive assembly of the target irradiation systems shown in FIGS. 11 and 12.

As shown in FIGS. 11 and 12, an alternate embodiment of a target irradiation delivery system 70 in accordance with the present disclosure includes a mechanical cable drive assembly 72 (FIG. 16) to raise and lower the target capsules 12 (FIGS. 2A and 2B) directly into the moderator, thus eliminating the need for the hydraulic system disclosed in the first embodiment (FIGS. 1 through 10). After being raised and purged, the target capsules 12 are pneumatically transferred to the flask loader 44.

Figure 13A:
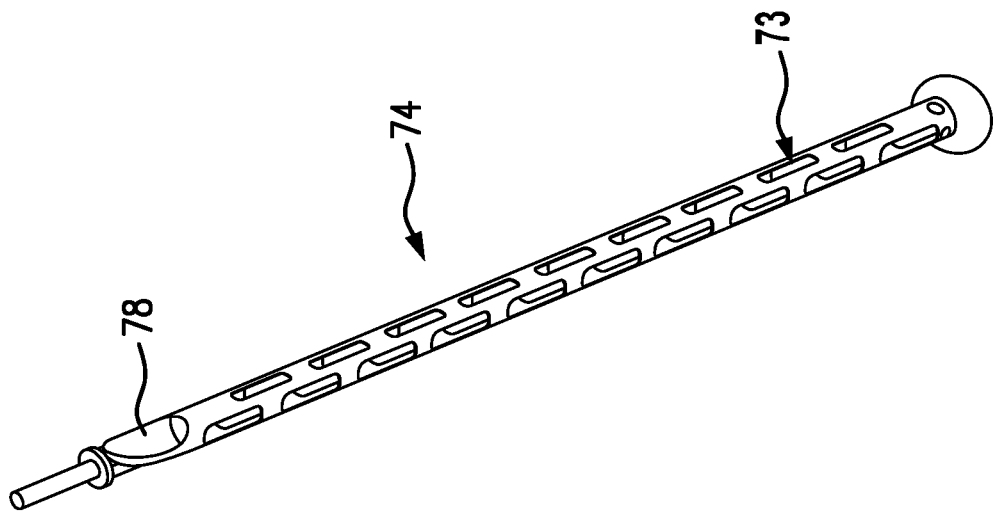
FIGS. 13A and 13B are perspective views of a target basket of the target irradiation systems shown in FIGS. 11 and 12.
Figure 13B:
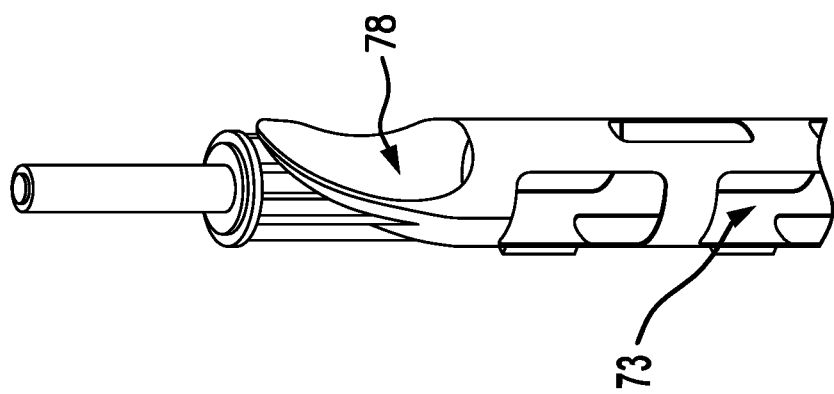

Referring additionally to FIGS. 13A and 13B, the target capsules 12 are held and lowered into the core within a basket 74, which also acts as a starting point for the pneumatic transfer operation. The basket 74 is formed in such a way that it can be held on center by the cable 76 of the cable drive assembly 72 while providing a pneumatic exit path 78 for the target capsules as they are ejected to the pneumatic piping system 42 via a partial tube bend to the side. The basket 74 is drawn into the body 71 target delivery system 70 which is mounted on top of the existing adjuster port. The cable drive assembly 72 includes a winch 75 (FIG. 16) mounted on top of the body 71 target delivery system 70, thereby forming part of the containment boundary of the reactor similar to the existing reactivity mechanism drives.

Figure 14A:
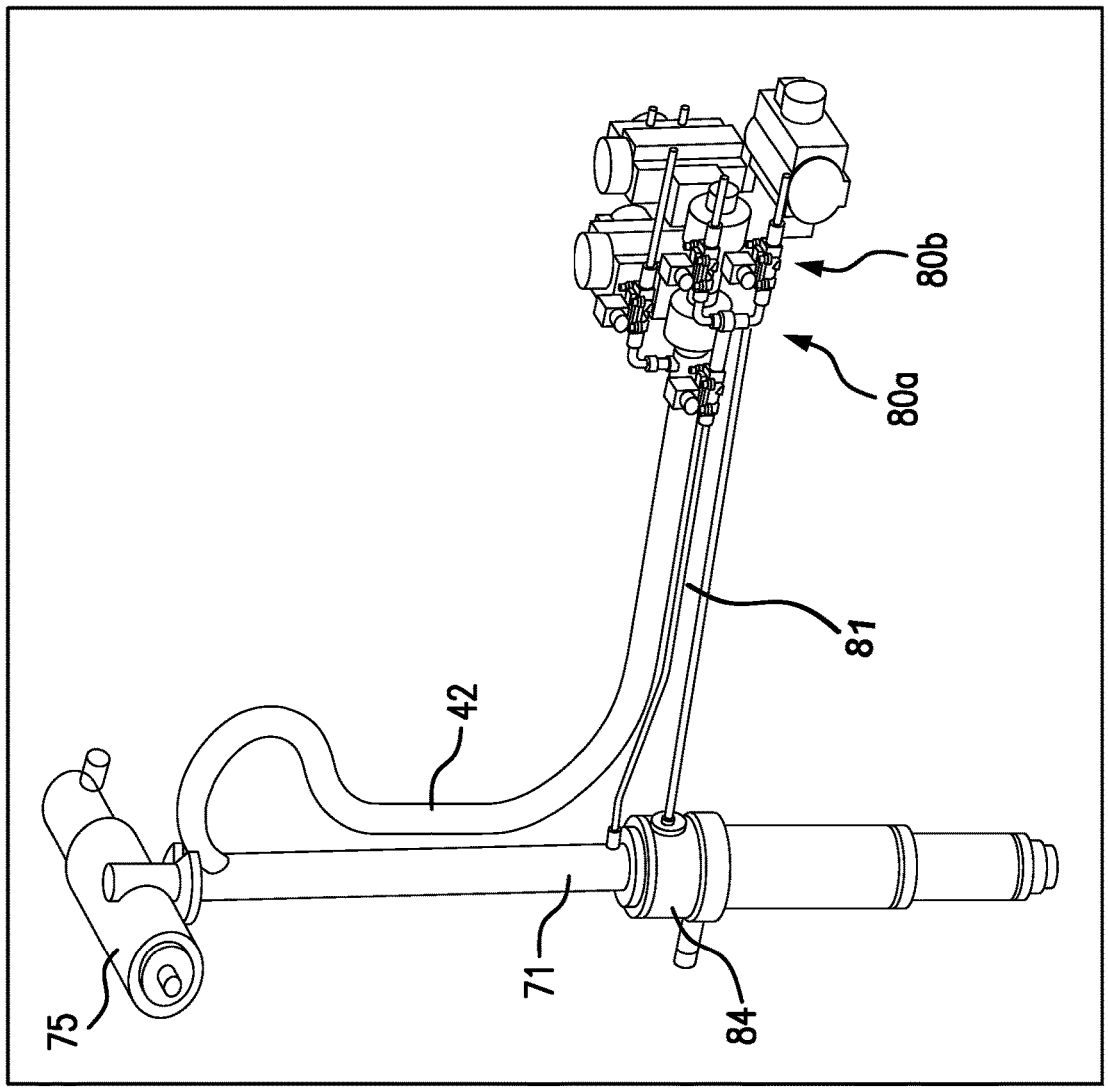
FIGS. 14A and 14B are perspective views of the target irradiation system shown in FIG. 11.
Figure 14B:
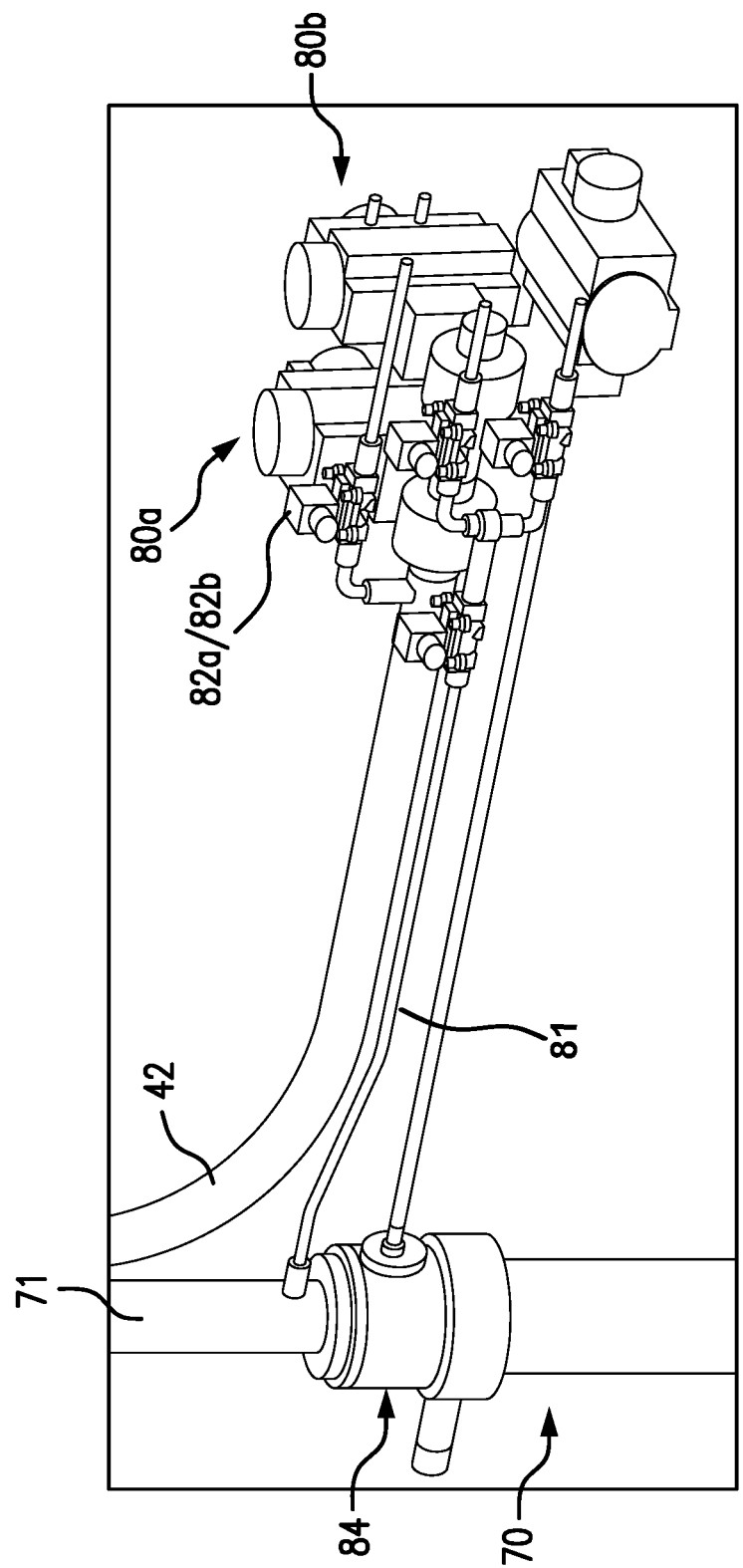
Figure 15:
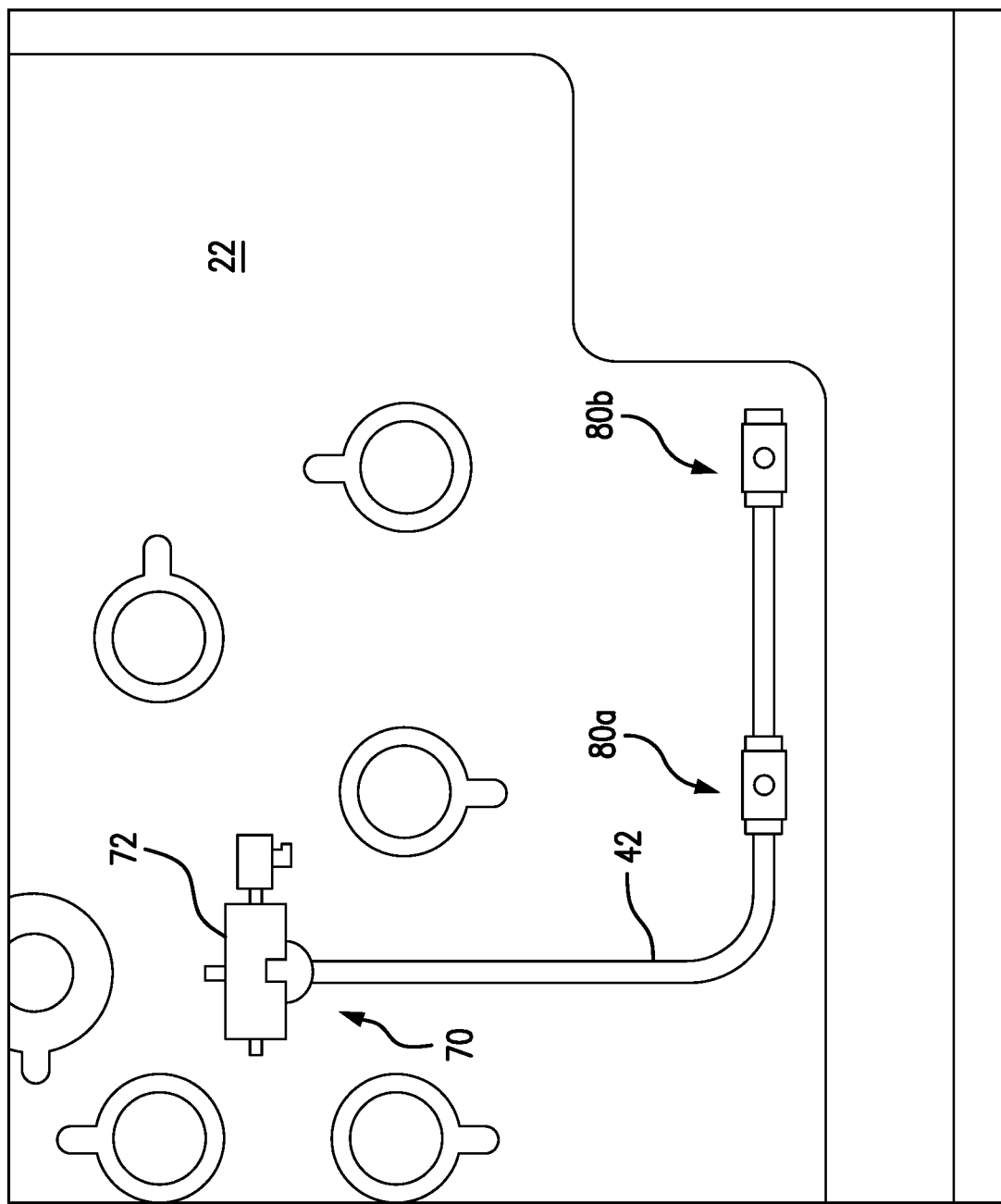
FIG. 15 is a top view of the target irradiation system shown in FIG. 11 installed on a reactivity mechanism deck of a CANDU reactor.

While the target capsules 12 are being irradiated, the operational containment boundary is established by the first of two ball valves 80a and 80b (FIGS. 14A and 14B) located just off the RMD 22, as best seen in FIG. 15, and two solenoid valves 82a and 82b, which isolate the helium and air systems. Redundant valves provide a secondary containment boundary in the event of a failed primary containment valve, or a button up command. The basket 74 and cable 76 extend into the reactor through the maintenance valve and the lower containment valve 84, both of which are open for target insertion. The sidewall of the basket 74 includes a plurality of apertures 73 so that moderator fluid in the reactor may enter the basket 74 when the basket 74 is disposed in the reactor. During harvesting and seeding operations, while the target basket is raised into the target delivery system 70, operational containment is established by the lower containment valve 84 below the target delivery system 70.

The lower containment valve 84 and first upper containment ball valve 80a function as an airlock and at no time are both valves open. The maintenance valve (not shown) located below the lower containment valve acts as a service valve to isolate the system from containment should the lower containment valve (or rest of the system) require maintenance. Preferably, the locations of the existing AA ports being used for target irradiation are advantageous since they not only provide access to the highest flux in the core, but are also only 18" away from the peripheral portion of the RMD 22, as best seen in FIG. 15, where no drives are located.

The target basket 74 (FIGS. 13 and 13B) is raised out of the core at the required speed and parked for a dwell period of up to one hour at a location in the shield tank area to allow for activity to decay prior to transport. It is expected that the target capsules 12 and basket 74 will be relatively dry from dripping/residual heat left in the target capsules 12 after the dwell period.

Figure 20:
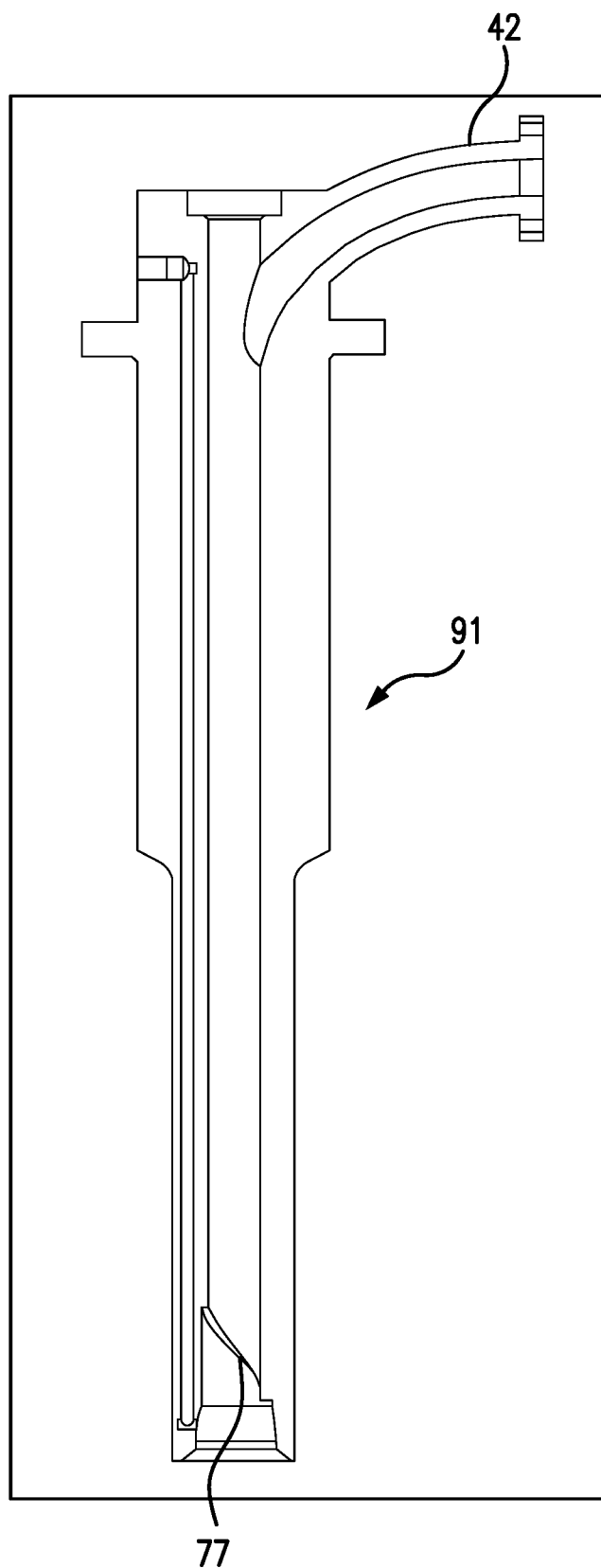
FIG. 20 is a cross-sectional view of a body portion of the target irradiation system shown in FIG. 19.
Figure 21:
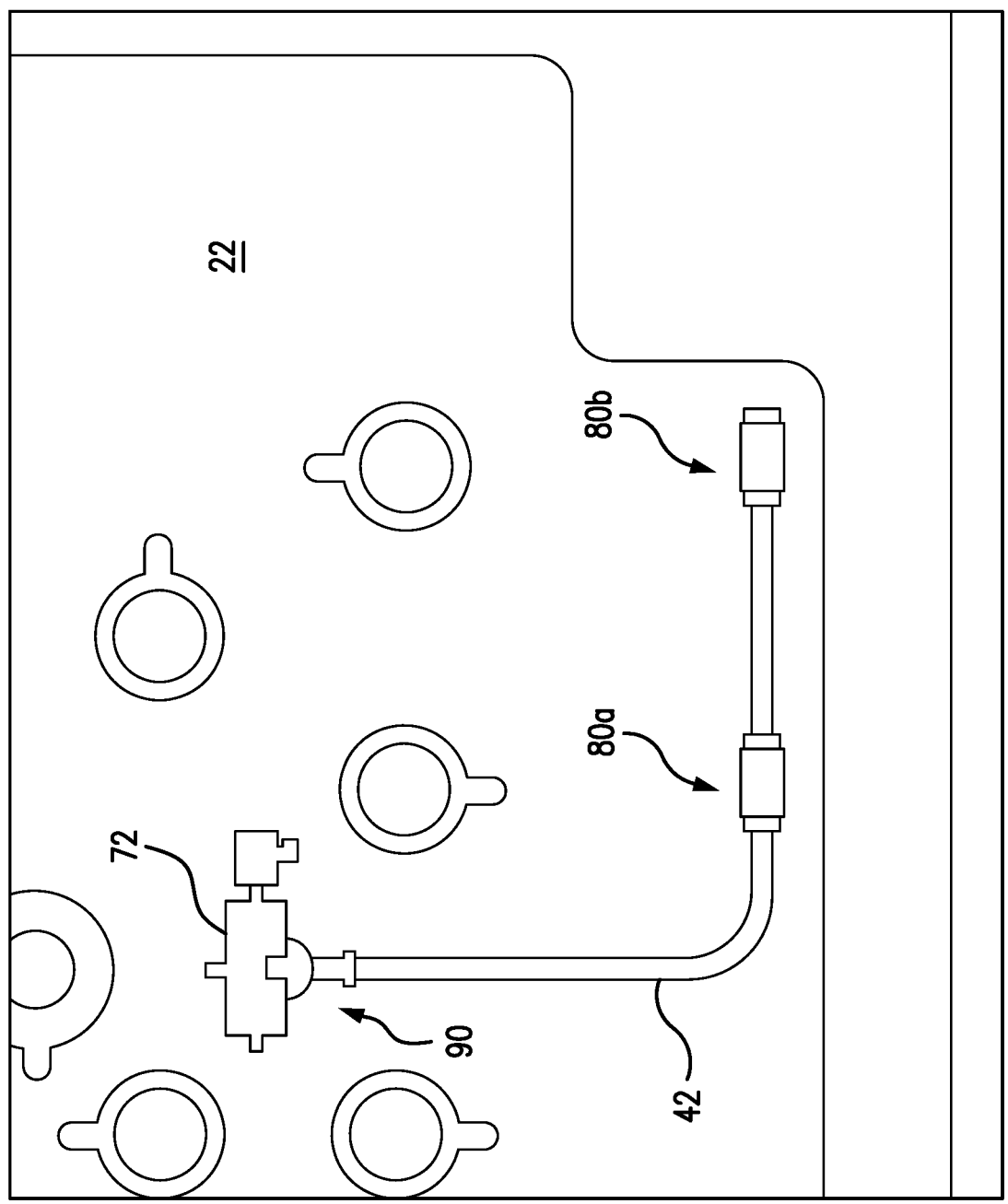
FIG. 21 is a top view of the target irradiation system shown in FIG. 19 installed on the reactivity mechanism deck of a CANDU reactor.

After the dwell period is complete, the target basket 74 is raised and accepted into the body 71 of the target delivery system 70. A helical groove 77 (FIGS. 12 and 20) aligns the target exit 78 in the basket 74 with the pneumatic piping system 42 as it enters the mechanism. Helium is then injected into the system via a pneumatic inlet 81 to flush MCG back into AA port, expelling airborne impurities (such as Ar41) back into containment.

After purging the target delivery system 70 with helium, the lower containment valve 84 at the bottom of the target delivery system 70 is closed, and the system undergoes a pressure test using helium to ensure the integrity of the seal. Upon successful completion of the pressure test, the lower air purge solenoid valve opens, as does the upper exhaust solenoid valve, and air is blown in from the pneumatic system to purge the helium out to contaminated exhaust. This purging both expels the helium and also dries the target capsules 12, if necessary. The exhausted air is monitored for moisture to ensure the target is dry before exiting the target delivery mechanism.

Upon successful drying sequence, the upper containment valve 80a is opened and the lower exhaust solenoid valve is closed. The target capsules 12 are then blown either as a string or one at a time by use of a singulating mechanism, through the flight tubes and directly to the flask loading station 44 (FIG. 1).

Figure 17:
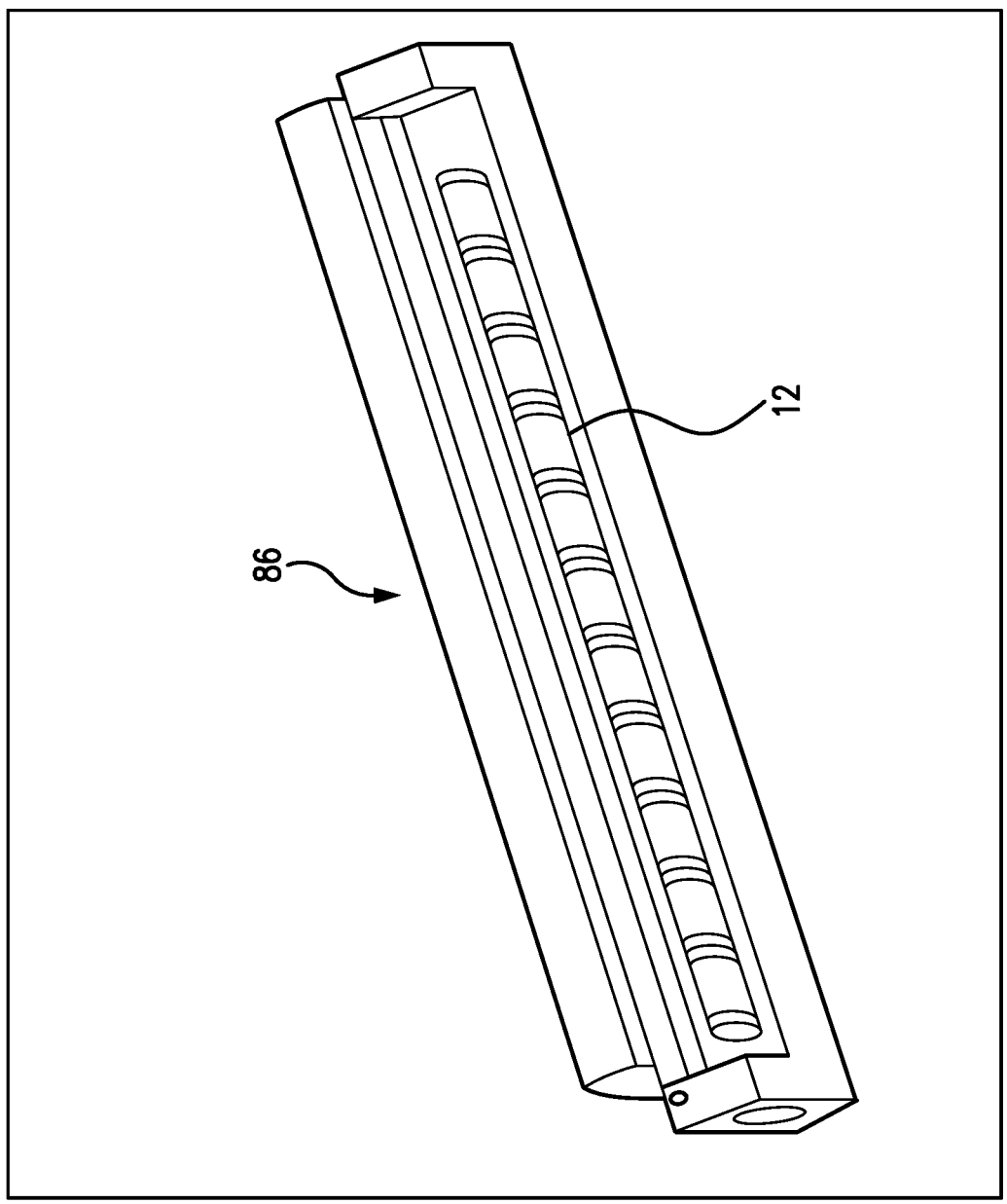
FIG. 17 is a perspective view of a seeding drawer and a corresponding string of target capsules.

Referring now to FIGS. 1 and 17, new target capsules 12 are placed into the pneumatic piping system 42 by an operator. A seeding drawer 86, or breach, is recommended on each target capsule line to simplify target loading with minimal complexity. Once the string of new target capsules 12 is loaded, pneumatic pressure is applied to the piping system and the string of target capsules is blown directly into the basket 74. A means of slowing or arresting the string of target capsules 12 is preferably incorporated in the bottom of the basket 74 to limit shock fatigue on basket 74 and cable 76 during seeding.

After all target capsules 12 are in the basket 74, the upper containment valve 80a is closed, the lower exhaust valve and upper helium valves are opened, and the chamber is purged of air and replaced with helium. After the air is purged, the lower exhaust valve is closed and the cavity is pressurized for a leak down test using helium. The upper helium valve is closed and pressure decay is monitored. This test ensures that the integrity of all containment valves is established. The lower containment valve 84 is then opened and the basket 74 and target capsules 12 are lowered into the Calandria 19 (FIG. 1) to begin the next irradiation cycle.

Figure 19:
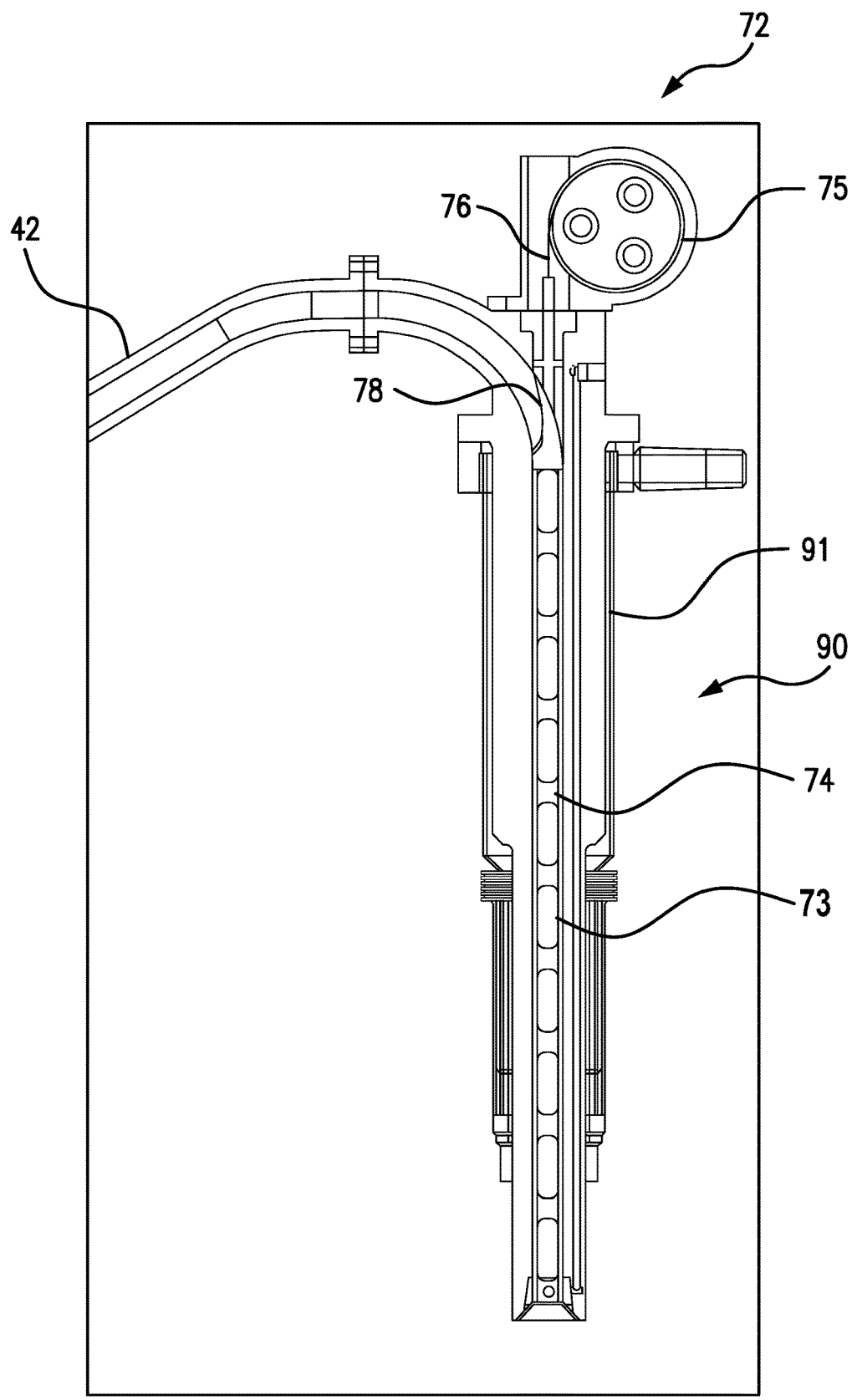
FIG. 19 is a cross-sectional view of an alternate embodiment of a target irradiation system in accordance with the present invention.
Figure 22:
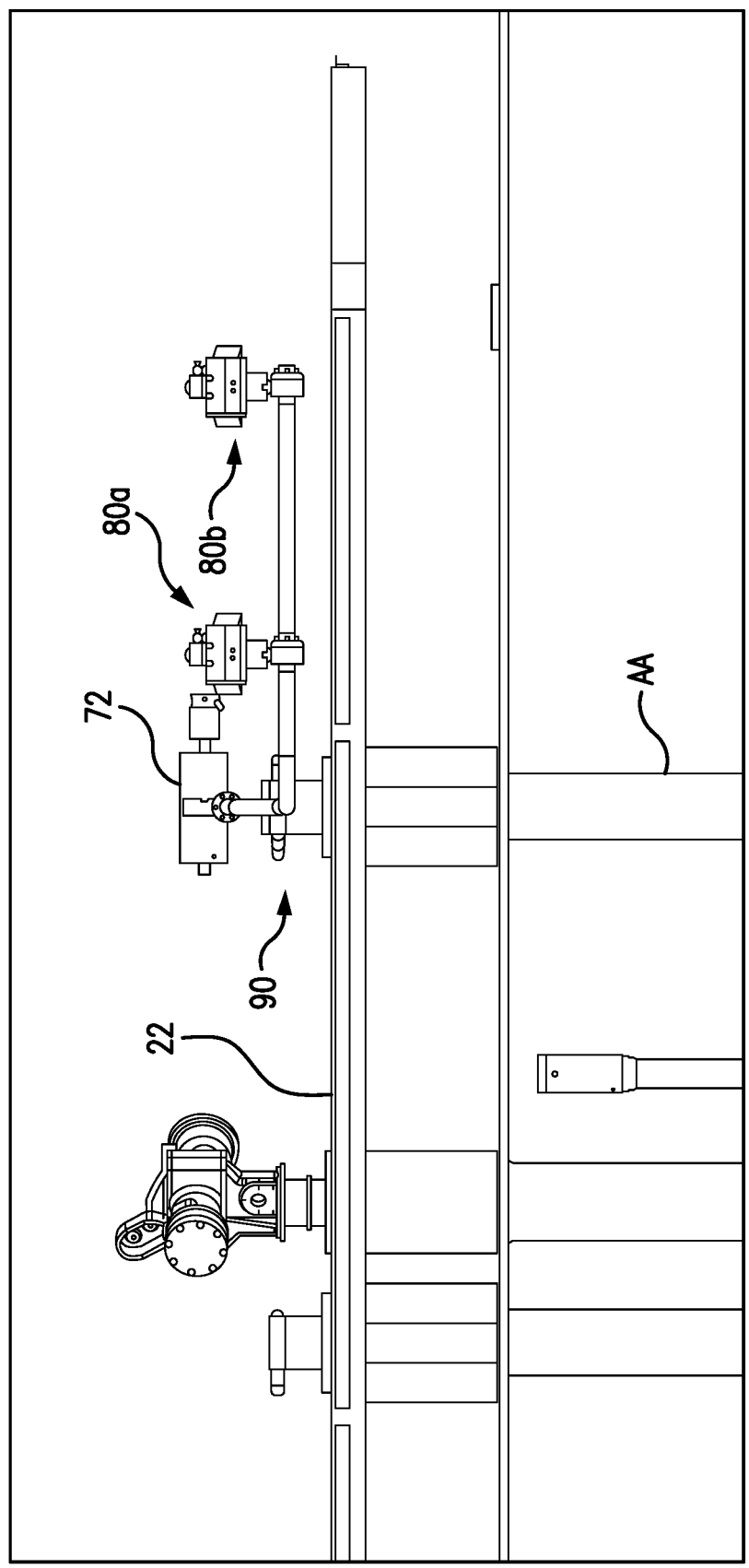
FIG. 22 is a side view of the target irradiation system shown in FIG. 19 installed on the reactivity mechanism deck of a CANDU reactor.

Referring now to FIGS. 19 through 22, yet another alternate embodiment of a target irradiation delivery system 90 in accordance with the present disclosure is shown. This third embodiment is practically identical to the previously discussed second embodiment 70, as shown in FIGS. 11 through 18, with the exception that the overall height of the present embodiment 90 above the RMD 22 is less than that of the second embodiment 70. This difference in height is best seen in FIGS. 19 and 22 (the present embodiment 90) as compared to FIGS. 11 and 14 (the second embodiment 70), and achieved by extending the body 91 of the present embodiment downwardly into the AA port rather than allowing it to extend upwardly from the AA port. The reduced height of target delivery system 90 is preferable in that it reduces the likelihood of excessive vibration during potential seismic events. As well, the reduced height lessens the chance that the target delivery system 90 will be inadvertently contacted by personnel or equipment that is moving about the RMD 22, such as during maintenance. As the other elements of the second and third embodiments 70 and 90, respectively, are almost identical, these discussions are not repeated here.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A target irradiation system for irradiating a radioisotope target in a vessel penetration of a fission reactor containing a moderator, comprising:
    a target delivery assembly including a body defining a central bore, a basket that is slidably receivable within the central bore of the body, and a winch that is connected to the basket by a cable, the target delivery assembly being affixed to the vessel penetration of the reactor; and
    a target passage that is in fluid communication with the target delivery assembly,
    wherein the basket is configured to receive the radioisotope target therein via the target passage and be lowered through the vessel penetration into the moderator of the reactor so that the basket contacts the moderator when irradiating the radioisotope target, and the target delivery assembly forms a portion of the pressure boundary of the reactor when in fluid communication with the reactor.

2. The target irradiation system of claim 1, wherein the fission reactor is a heavy-water moderated fission reactor and the vessel penetration is an adjuster port.

3. The target irradiation system of claim 2, wherein the radioisotope target is comprised of natural molybdenum.

4. The target irradiation system of claim 1, wherein the target delivery assembly is affixed to the vessel penetration so that a portion of the body of the target delivery assembly extends downwardly into the vessel penetration.

5. The target irradiation system of claim 4, wherein the vessel penetration is an adjustor absorber port.

6. The target irradiation system of claim 1, further comprising:
    a pneumatic pressure source; and
    a pneumatic inlet in fluid communication with the central bore of the body of the target delivery assembly so that pneumatic pressure is applied to the radioisotope target.

7. A target irradiation system for irradiating a radioisotope target in a vessel penetration of a fission reactor containing a moderator, comprising:
    a target delivery assembly including a body defining a central bore, a basket that is slidably receivable within the central bore of the body, and a winch that is connected to the basket by a cable, the target delivery assembly being affixed to the vessel penetration of the reactor;

a target passage that is in fluid communication with the target delivery assembly; and a substantially cylindrical target capsule in which the radioisotope target is disposed, wherein the target capsule includes a pair of annular side bulges extending radially-outwardly therefrom, wherein the basket is configured to receive the radioisotope target therein via the target passage and be lowered through the vessel penetration into the moderator of the reactor when irradiating the radioisotope target, and the target delivery assembly forms a portion of the pressure boundary of the reactor when in fluid communication with the reactor.

8. The target irradiation system of claim 7, wherein the fission reactor is a heavy-water moderated fission reactor and the vessel penetration is an adjuster port.

9. The target irradiation system of claim 8, wherein the radioisotope target is comprised of natural molybdenum.

10. The target irradiation system of claim 7, wherein the target delivery assembly is affixed to the vessel penetration so that a portion of the body of the target delivery assembly extends downwardly into the vessel penetration.

11. The target irradiation system of claim 10, wherein the vessel penetration is an adjustor absorber port.

12. The target irradiation system of claim 7, wherein the basket further comprises a cylindrical side wall including a plurality of apertures so that a moderator fluid of the fission reactor may enter the basket when the basket is disposed in the fission reactor.

13. The target irradiation system of claim 7, wherein one annular side bulge of the pair is disposed at each end of the target capsule.

14. The target irradiation system of claim 7, further comprising:

a pneumatic pressure source; and a pneumatic inlet in fluid communication with the central bore of the body of the target delivery assembly so that pneumatic pressure is applied to the radioisotope target.

15. A target irradiation system for irradiating a radioisotope target in a vessel penetration of a fission reactor containing a moderator, comprising:

a target delivery assembly including a body defining a central bore, a basket that is slidably receivable within the central bore of the body, and a winch that is connected to the basket by a cable, the target delivery assembly being affixed to the vessel penetration of the reactor; and a target passage that is in fluid communication with the target delivery assembly, wherein the basket is configured to receive the radioisotope target therein via the target passage and be lowered through the vessel penetration into the moderator of the reactor when irradiating the radioisotope target, and the target delivery assembly forms a portion of the pressure boundary of the reactor when in fluid communication with the reactor, and wherein the basket further comprises a cylindrical side wall including a plurality of apertures so that the moderator fluid of the fission reactor may enter the basket when the basket is disposed in the moderator of the fission reactor.

16. The target irradiation system of claim 15, wherein the fission reactor is a heavy-water moderated fission reactor and the vessel penetration is an adjuster port.

17. The target irradiation system of claim 16, wherein the radioisotope target is comprised of natural molybdenum.

* * * * *